(12) United States Patent
Sollis et al.

(10) Patent No.: US 9,824,367 B2
(45) Date of Patent: Nov. 21, 2017

(54) MEASURING EFFECTIVENESS OF MARKETING CAMPAIGNS ACROSS MULTIPLE CHANNELS

(75) Inventors: Chad Sollis, Herriman, UT (US); Mikel Chertudi, Lehi, UT (US)

(73) Assignee: Adobe Systems Incorporated, San Jose, CA (US)

( * ) Notice: Subject to any disclaimer, the term of this patent is extended or adjusted under 35 U.S.C. 154(b) by 1988 days.

(21) Appl. No.: 12/203,749

(22) Filed: Sep. 3, 2008

(65) Prior Publication Data
US 2014/0244345 A1 Aug. 28, 2014

Related U.S. Application Data

(60) Provisional application No. 60/970,829, filed on Sep. 7, 2007.

(51) Int. Cl.
*G06Q 30/00* (2012.01)
*G06Q 30/02* (2012.01)

(52) U.S. Cl.
CPC .................... *G06Q 30/02* (2013.01)

(58) Field of Classification Search
USPC .................... 705/7.29, 7.38, 14.41
See application file for complete search history.

(56) References Cited

U.S. PATENT DOCUMENTS

| | | | |
|---|---|---|---|
| 6,286,005 B1* | 9/2001 | Cannon | G06Q 30/02 455/2.01 |
| 7,062,458 B2 | 6/2006 | Maggioncalda et al. | |
| 7,729,940 B2 | 6/2010 | Harvey et al. | |
| 7,873,535 B2 | 1/2011 | Umblijs et al. | |
| 7,949,561 B2* | 5/2011 | Briggs | 705/14.41 |
| 2002/0072957 A1* | 6/2002 | Thompson | G06Q 10/063 705/7.29 |
| 2003/0088489 A1 | 5/2003 | Peters et al. | |
| 2004/0093259 A1* | 5/2004 | Pych | 705/10 |
| 2004/0093296 A1* | 5/2004 | Phelan | G06Q 30/02 705/36 R |

(Continued)

OTHER PUBLICATIONS

Long, Mary, Tellefsen, Thomas and Lichtenthal, J. David. Internet integration into the industrial selling process: a step by step approach. Science Direct, Industrial Marketing Management 36, pp. 676-689, (2007).*

(Continued)

*Primary Examiner* — Stephanie Delich
(74) *Attorney, Agent, or Firm* — Kilpatrick Townsend & Stockton LLP

(57) ABSTRACT

A closed-loop marketing system and method provides the ability to measure the return on investment of marketing programs across channels, both online and offline, including impression, page view and response levels. The present invention provides mechanisms for measuring a marketing department's contribution to the sales pipeline by taking into account the effect of multiple campaigns. A multi-campaign attribution methodology takes into measures the effect of a first touch (a campaign that first brought in an account), a last touch (a campaign that was presented immediately prior to the closing of a deal or creation of a sales-ready opportunity), and any significant re-touch events (campaigns that represent lead-nurturing and/or remarketing efforts).

16 Claims, 19 Drawing Sheets

(56) References Cited

U.S. PATENT DOCUMENTS

| | | |
|---|---|---|
| 2005/0071218 A1* | 3/2005 | Lin .................. G06Q 30/00 705/14.44 |
| 2006/0173744 A1 | 8/2006 | Kandasamy et al. |
| 2007/0106550 A1 | 5/2007 | Umblijs et al. |
| 2007/0143186 A1* | 6/2007 | Apple et al. .................. 705/14 |
| 2007/0157245 A1* | 7/2007 | Collins ............. G06F 17/2785 725/46 |
| 2008/0281699 A1* | 11/2008 | Whitehead .................. 705/14 |
| 2008/0288328 A1* | 11/2008 | Minor ................ G06Q 10/0639 705/14.42 |
| 2009/0259518 A1* | 10/2009 | Harvey et al. .................. 705/10 |
| 2010/0057517 A1 | 3/2010 | Jerkins et al. |

OTHER PUBLICATIONS

Doyle, Shaun. Software Review A sample road map for analytic CRM. Database Marketing & Customer Strategy Management vol. 12, 4, pp. 362-377, Hendry Stewart Publications (2005).*

Kudyba, Stephan, Ananyan, Sergei, and Lawrence, Kenneth. The Utilization of Data Mining Analytics to Enhance the Return on Investment of Online Document Repositories. AMCIS 2004 Proceedings. http://aisel.aisnet.org/amcis2004/122.*

U.S. Appl. No. 12/572,727, filed Oct. 2, 2009, Kevin Willeitner, et al.

* cited by examiner

| | | | | | |
|---|---|---|---|---|---|
| 3. | Text Link Ad | $15.00 | $4,582.00 | $1,593.74 | $13.82 | $73,300.75 |
| 1. | ROI World | $#DIV/0! | $#DIV/0! | $0.00 | $#DIV/0! | $#DIV/0! |
| 2. | Tech Results | $#DIV/0! | $0.00 | $0.00 | $#DIV/0! | $119,582.00 |
| 3. | Software.com | $#DIV/0! | $0.00 | $0.00 | $#DIV/0! | $27,208.50 |
| 4. | Software Integration | $#DIV/0! | $0.00 | $0.00 | $#DIV/0! | $118,826.00 |
| 5. | Implementation News Network | $-1.00 | $#DIV/0! | $4,582.00 | $13.82 | $#DIV/0! |
| 4. | Trade Show | $12.45 | $5,002.32 | $1,828.13 | $289.07 | $67,259.50 |
| 1. | Tech Daily | $67.95 | $2,625.00 | $1,500.00 | $155.56 | $180,993.75 |
| 2. | Software World | $43.78 | $15,000.00 | $1,875.00 | $120.00 | $671,657.00 |
| 3. | ROI Alerts | $19.20 | $3,126.11 | $1,053.75 | $248.32 | $63,147.75 |
| 4. | Business Updates | $15.31 | $4,000.00 | $1,132.08 | $275.23 | $65,228.87 |
| 5. | BT Publishing | $12.39 | $6,803.29 | $3,663.31 | $355.40 | $91,085.43 |
| 5. | eNewsletter | $11.80 | $4,926.47 | $2,930.94 | $4.41 | $63,057.00 |

View Full Report | Refresh Report

*FIG. 5C-2*

| *FIG. 5C-1* |
|---|
| *FIG. 5C-2* |

*FIG. 5C*

| | | | | | | | | | |
|---|---|---|---|---|---|---|---|---|---|
| 3. | Text Link Ad | $15.00 | | | 23 | | 14 | 8 | |
| 1. | ROI World | $#DIV/0! | 0 | 0.0% | 2 | 0.0% | 2 | 0.1% | 0 | 0.0% |
| 2. | Tech Results | $#DIV/0! | 0 | 0.0% | 4 | 0.1% | 3 | 0.1% | 3 | 0.2% |
| 3. | Software.com | $#DIV/0! | 0 | 0.0% | 8 | 0.1% | 3 | 0.1% | 4 | 0.2% |
| 4. | Software Integration | $#DIV/0! | 0 | 0.0% | 1 | 0.0% | 1 | 0.0% | 1 | 0.1% |
| 5. | Implementation News Network | $-1.00 | 2,653 | 0.8% | 8 | 0.1% | 5 | 0.2% | 0 | 0.0% |
| 4. | Trade Show | $12.45 | 5,053 | 0.0% | 799 | | 493 | | 292 | |
| 1. | Tech Daily | $67.95 | 135 | 0.0% | 14 | 0.2% | 10 | 0.4% | 8 | 0.4% |
| 2. | Software World | $43.78 | 125 | 0.0% | 8 | 0.1% | 9 | 0.3% | 1 | 0.1% |
| 3. | ROI Alerts | $19.20 | 2,266 | 0.7% | 534 | 8.8% | 307 | 11.6% | 180 | 9.0% |
| 4. | Business Updates | $15.31 | 218 | 0.1% | 53 | 0.9% | 36 | 1.4% | 15 | 0.8% |
| 5. | BT Publishing | $12.39 | 134 | 0.0% | 13 | 0.2% | 15 | 0.6% | 7 | 0.4% |
| 5. | eNewsletter | $11.80 | 52,563 | | 79 | | 58 | | 47 | |

View Full Report | Refresh Report

*FIG. 5D-2*

| *FIG. 5D-1* |
|---|
| *FIG. 5D-2* |

*FIG. 5D*

| 3. | White Paper | 7,801,407 | 0.6% | 379,996 | 0.6% | 30.01% | 114,036 | 0.5% | 0.48 |
|---|---|---|---|---|---|---|---|---|---|
| 1. | Applications That Work Guide | 118,995 | 10.3% | 5,684 | 10.7% | 26.90% | 1,529 | 10.2% | 3.92 |
| 2. | Key Performance Issues | 2,058,782 | 10.3% | 106,984 | 10.7% | 30.92% | 33,082 | 10.2% | 0.66 |
| 3. | Implementation Failsafes | 2,603,620 | 13.0% | 130,714 | 13.1% | 31.65% | 41,368 | 12.7% | 0.47 |
| 4. | IT ORG Software Guide | 458,062 | 2.3% | 20,392 | 2.0% | 32.30% | 6,587 | 2.0% | 0.35 |
| 5. | Integration Success Guide | 1,124,133 | 5.6% | 23,543 | 2.4% | 32.82% | 7,727 | 2.4% | 0.34 |
| 4. | Case Study | 130,235 | | 3,783 | | 13.90% | 526 | | 0.38 |
| 1. | ASP Solutions | 89,635 | 0.4% | 1,365 | 0.1% | 5.71% | 78 | 0.0% | 1.28 |
| 2. | Enterprise Grade | 600 | 0.0% | 56 | 0.0% | 273.21% | 153 | 0.0% | 0.65 |
| 3. | Software Today | 2,500 | 0.0% | 1,974 | 0.2% | 2.28% | 45 | 0.0% | 0.00 |
| 4. | Software Solutions | 36,000 | 0.2% | 325 | 0.0% | 38.46% | 125 | 0.0% | 0.00 |
| 5. | Webinar | 3,325,655 | | 142,123 | | 30.62% | 43,521 | | 0.31 |
| 1. | How to Choose the Right Software Package | 403,716 | 2.0% | 17,484 | 1.8% | 27.39% | 4,789 | 1.5% | 1.92 |
| 2. | Software In Your Business | 355,888 | 1.8% | 11,001 | 1.1% | 37.59% | 4,135 | 1.3% | 0.53 |
| 3. | Purchasing Technology | 581,579 | 2.9% | 28,682 | 2.9% | 26.02% | 7,463 | 2.3% | 0.11 |
| 4. | TechNet: Software vs ASP | 459,082 | 2.3% | 18,111 | 1.8% | 41.76% | 7,563 | 2.3% | 0.11 |
| 5. | Using Web Services | 253,000 | 1.3% | 13,263 | 1.3% | 23.90% | 3,170 | 1.0% | 0.06 |

View Full Report | Refresh Report

*FIG. 5E-2*

| *FIG. 5E-1* |
|---|
| *FIG. 5E-2* |

*FIG. 5E*

Largest Deal Size by Campaign Tactic

| Media Tactic | Impressions | | Clicks | | Response | | Opty: All | |
|---|---|---|---|---|---|---|---|---|
| 1. Email | 11,307,876 | 54.5% | 522,424 | 50.2% | 185,097 | 54.5% | 1,814 | 27.8% |
| 2. eNewsletter | 4,079,063 | 19.7% | 263,941 | 25.4% | 56,571 | 16.6% | 89 | 1.4% |
| 3. Banner | 3,626,429 | 17.5% | 149,398 | 14.4% | 47,882 | 14.1% | 145 | 2.2% |
| 4. Text Link Ad | 645,584 | 3.1% | 29,667 | 2.9% | 2,653 | 0.8% | 25 | 0.4% |
| 5. Print Ad | 447,613 | 2.2% | 8,887 | 0.9% | 3,822 | 1.1% | 9 | 0.1% |
| 6. Direct Mail | 423,239 | 2.0% | 35,310 | 3.4% | 4,296 | 1.3% | 93 | 1.4% |
| 7. Trade Show | 218,796 | 1.1% | 0 | 0.0% | 5,306 | 1.6% | 884 | 13.5% |
| 8. Website – Direct | 2,100 | 0.0% | 30,912 | 3.0% | 110 | 0.0% | 782 | 12.0% |
| 9. Teleprospecting | 0 | 0.0% | 0 | 0.0% | 34,106 | 10.0% | 426 | 6.6% |
| 10. None | 0 | 0.0% | 0 | 0.0% | 0 | 0.0% | 1,845 | 28.3% |
| Total | 20,750,700 | | 1,040,539 | | 339,843 | | 6,524 | |

View Full Report | Refresh Report

FIG. 5G

MEASURING EFFECTIVENESS OF MARKETING CAMPAIGNS ACROSS MULTIPLE CHANNELS

CROSS-REFERENCE TO RELATED APPLICATIONS

The present patent application claims priority from U.S. Provisional Patent Application Ser. No. 60/970,829, filed Sep. 7, 2007, for "Closed-Loop Marketing", which is incorporated herein by reference.

FIELD OF THE INVENTION

The present invention is related to analysis of marketing campaigns, and more particularly to improved techniques for measuring the return on investment of marketing programs across all channels, including both online and offline campaigns.

DESCRIPTION OF THE BACKGROUND ART

Business-to-business (B2B) marketing organizations spend billions of dollars every year on customer acquisition, also referred to as demand generation. While these companies may know how many new leads they are generating, they typically have no way of determining how many of those leads actually generate revenue. Therefore, they have no way to calculate their true return on investment (ROI).

With significant increases over the last several years in online research for buyers and online marketing spend for B2B organizations, the challenge becomes even more complex. Today, marketing organizations are interested in measuring ROI across both online and offline channels, simultaneously, and in a way that allows comparison of results at every stage of the marketing and sales lifecycle across all types of campaigns. Without the ability to compare the success of different programs, marketing organizations cannot improve their portfolio of marketing investments or continue to innovate to increase business performance.

Historically, in many organizations, a barrier exists between sales and marketing. The sales team typically believes that the marketing department is sending them unqualified leads. The marketing department believes the sales team is not focusing on qualification of marketing-sourced leads, assuming they are inferior to sales-generated leads. Conventional systems fail to provide either department with the analysis tools needed to properly evaluate leads and determine which marketing campaigns are most effective.

In addition, conventional customer relationship management (CRM) systems generally fail to measure the effectiveness of multiple campaigns in influencing customer behavior. One closed deal could possibly have a large number of different campaigns associated with it, depending on the number of campaigns associated with each contact and the total number of unique contacts (both decision makers and influencers) on the account. If several events (or "touches") take place in which the customer is exposed to a marketing campaign or series of campaigns, conventional systems fail to provide any meaningful way to determine which such events (or combinations of events) tend to be most effective for various types of customers. In particular, many existing systems perform analysis at the level of individual contacts rather than at the level of an account; thus, when several contacts (persons) are associated with an account, these existing systems fail to perform useful analysis as to the effectiveness of multiple contact points in terms of their ability to encourage customers to make purchases. Also, existing systems often fail to provide any mechanism for measuring the effectiveness of first touch, last touch, or multi-touch campaigns.

Accordingly, existing systems do not provide a complete picture of the effectiveness of marketing operations. In particular, such systems often fail to measure their effectiveness from the first impression to closed deal for both online and offline campaigns across all channels, tactics, offers and formats in a single system.

What is needed is a system and method that breaks down barriers between sales and marketing divisions of a company by delivering useful reports that chart the effectiveness of efforts across all stages of the marketing and sales process.

What is further needed is a system and method that analyzes the effect of multiple events and/or campaigns on customer behavior, so as to more accurately gauge the effectiveness of such multiple events and/or campaigns in bringing in customers.

What is further needed is a system and method that analyzes marketing efforts at an account level, so as to properly analyze the actions of multiple contact points associated with a single account.

SUMMARY OF THE INVENTION

The present invention is a closed-loop, marketing system and method that provides the ability to measure the return on investment of marketing programs across all channels, both online and offline, including impression, page view and response levels. In the context of the description provided herein, "closed-loop" means that the system measures from the beginning marketing campaign metrics including costs, ad impressions, emails sent, clicks, contacts and leads all the way through to qualified opportunities, closed business, and sales.

In one embodiment, the present invention is implemented as part of a plug-and-play application designed to reduce complexity and increase marketing ROI by automating the integration of marketing tools into a single platform.

The present invention provides mechanisms for measuring a marketing department's contribution to the sales pipeline by taking into account the effect of multiple campaigns. For example, in one embodiment the system of the present invention uses a multi-campaign attribution methodology that takes into measures the effect of the first touch (the campaign that first brought in the account), the last touch (the campaign that was presented immediately prior to the closing of a deal or creation of a sales-ready opportunity), and any significant retouch events (campaigns that represent lead-nurturing and/or remarketing efforts).

In this manner, the present invention is able to measure the effectiveness of marketing efforts at all stages, and is not limited to measuring effectiveness at one particular point along the path to a closed deal. The present invention is also able to perform comparative analysis of multiple campaign types, channels, and offers.

The present invention provides any or all of the following features.

Create end-to-end visibility of marketing results throughout the sales cycle, from start to finish Enable online campaign ROI at the impression, page view, and click level Enable offline campaign ROI at the offer level (whitepapers, product tours, case studies) and response level (events by attendees and registrants, direct mail by test group)

Consolidate online and offline campaign metrics into one holistic view

Create a system that maximizes ability to emphasize high value campaigns and de-emphasize low value campaigns Understand the influence of specific types of offers or tactics on sales success—either by increasing close rates or increasing average deal size Enable reporting and delivery of comprehensive metrics across organizations and management levels

Figure 1:
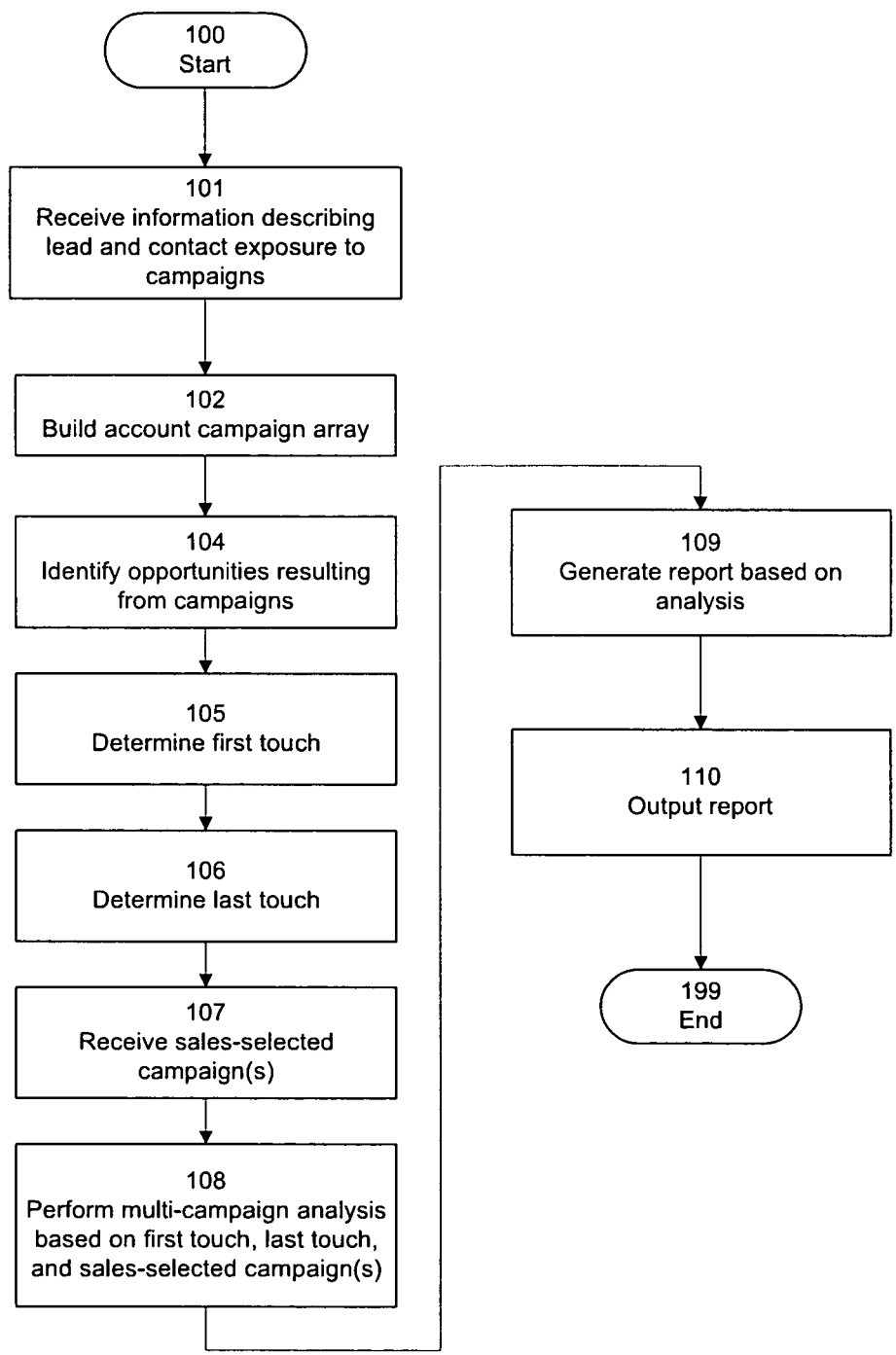
FIG. 1 is a flow diagram depicting a method of selecting campaigns for analysis according to one embodiment of the present invention.

The Figures depict a preferred embodiment of the present invention for purposes of illustration only. One skilled in the art will readily recognize from the following discussion that alternative embodiments of the structures and methods illustrated herein may be employed without departing from the principles of the invention described herein.

DETAILED DESCRIPTION

The following description and accompanying figures are merely illustrative of the techniques of the invention. One skilled in the art will recognize that the techniques of the invention can be implemented in other ways and in other contexts. In addition, the particular layout and appearance of the screen shots and reports provided herein are intended to be exemplary.

In the following description, the terms "touch" and "opportunity" are used. A "touch" is an exposure to a marketing campaign. An "opportunity" is a definable event that moves the seller (or provider) closer to closing a deal. What constitutes an "opportunity" can be defined by the user of the system. For example, in one context an opportunity can be a situation where a deal has been closed; in another context an opportunity can be a recognition that a prospect exists.

The present invention can be implemented in connection with existing CRM applications or as a stand-alone system. For example, in one embodiment, the system of the present invention is implemented as a plug-in to a marketing platform. It is an application that enables comprehensive reporting of marketing results through the entire sales cycle and across online channels to the impression, page view, and click level and offline channels to the response level.

The system of the present invention provides marketers with a single process for establishing a comprehensive tracking and reporting system. The invention thereby avoids the need to combine online and pipeline metrics manually into spreadsheets to determine program ROI for each campaign tactic.

The system of the present invention also reduces the need to make inferences and best guesses as to which campaign tactic actually drives a new sales opportunity. Previously, marketers were forced to generalize ROI to the campaign level and were not able to measure their efforts down to the format, media source, or search term level. As a result, marketers often have no accurate way to attribute revenue to impressions, page views, clicks or specific types of responses.

The system of the present invention addresses each of these issues and more by integrating web analytics with CRM. The invention allows for consolidated online, offline and pipeline metrics in one system with no manual intervention, so as to concisely attribute revenue to all types of specific campaign variables. Accordingly, the invention provides any or all of the following features:

Real-time integration between click level detail and online CRM system

Auto-campaign tagging, ensuring campaign data entry into only one system

Intelligent scripting enabling automatic assignment and reporting of first touch, last touch, and sales-selected touch to ensure flexible and accurate opportunity source tagging Automated attribution of campaigns that influence existing opportunities (secondary sourcing)

Enablement of campaign ID persistence to all online visitors

Embedded online activity display at lead, account and contact level in CRM

Benefits

The present invention enables true end-to-end visibility of marketing results throughout the sales cycle, from start to finish, by showing comprehensive online campaign ROI at the click level, comprehensive offline campaign ROI at the offer and response level, and consolidated online and offline campaign metrics into single, holistic view of marketing ROI.

In addition, the invention improves overall marketing ROI by providing key information allowing a user to know and prioritize high value campaigns. This is accomplished by enabling comparison and prioritization of: all online tactics, including search term, email, ad format, media source and banner productivity; all offline tactics, including seminars, tradeshows, and direct mail productivity; offers including webcasts, whitepapers, case studies, and product tours; and campaigns across online and offline channels, creating platform to prioritize all types of tactics. The invention further provides detailed campaign metrics enabling optimization of marketing budgets.

The invention enables reporting/ROI capabilities across multiple campaign variables, including campaign initiatives (such as product launches), campaign goals (such as awareness, demand generation), promotional formats/offers (such as whitepapers, product tours), media sources (such as search engines, portals and content providers), tactic types (such as Email, paid search), and ad formats (such as banners).

The invention also improves individual campaign metrics and performance by increased overall subscription rate (reduced unsubscribe) due to an increased ability to eliminate poor producing outbound campaigns that turn off prospects. In addition, the invention improves data quality of the internal marketing database and increases knowledge of individual prospect and customer contacts.

In addition, the invention improves flexibility in marketing sourcing methodology, by facilitating various modes of analysis including first source, last source, and/or sales-selected source. The invention enables visibility into the influence of all specific types of offers on existing pipeline—either by increasing close rates or increasing average deal size, and further enables more comprehensive lead follow-up as a result of complete prospect marketing history. In addition, the invention enables optimum campaign integration, creating the ability to make the right offer, to the right person, at the right time.

In addition, the invention streamlines reporting and delivery of comprehensive metrics across organizations and management levels and automates delivery of out of the box and custom reports by user or user role. The invention also ensures consistent report delivery with customizable frequency and simplifies customization of detailed reporting for specific formats, offers, tactics, or campaigns with dashboards for specific marketing users, including: search marketers to understand most effective key words; online marketers to understand most effective media; web seminar experts to understand receptivity to specific messages or content; and event marketers to understand best seminar/event formats, timing or locations.

SUMMARY OF OPERATION

In one embodiment, the system of the present invention operates as follows. An array is generated, including descriptions of all marketing campaigns associated with a contact on an account, or with an account as a whole. A contact may be an individual, while an account may represent a company or organization having multiple contacts and leads that is either a customer or potential customer. Thus, the present invention is able to track campaign-related events associated with different contacts for the same account.

The present invention analyzes the effectiveness of multiple campaigns on the customer's behavior. In one embodiment, up to four types of analysis can be performed:
  Analysis can be performed on the "first" campaign, representing the campaign that was first presented to the account;
  Analysis can be performed on the "last" campaign, representing the campaign that was last presented to the account before a sale was closed or a sales-ready opportunity was created;
  Analysis can be performed on one or more additional campaigns, as selected by a salesperson or other analyst; these additional campaigns can be those that are of particular interest or that are most closely associated with the sales opportunity;
  Analysis can also be performed on the aggregated effect of all campaigns to which the account was exposed; this is referred to as "multi-touch" analysis. Multi-touch analysis is used to determine all of the campaign interactions, associated costs, and touchpoints leading to the creation of the opportunity, closed business and subsequent sales.

By performing these four analyses (or some subset) in combination with one another, the present invention provides a novel mechanism for measuring the effectiveness of multiple marketing campaigns and/or touches on a particular account. The most effective, having the highest ROI, can be selected for further use.

In one embodiment, the four analyses can be weighted according to their relative level of importance. For example, the sales-selected method may be discounted in importance as compared with the other forms of analysis, if a determination is made that this method is less accurate than other methods. Depending on a determination of the relative accuracy of the various types of analysis, other weightings can be implemented.

According to the techniques of the present invention, an improved level of analysis is facilitated for determining which campaign (or combination of campaigns) is effective in creating opportunities.

Although the following description sets forth the operation of the invention in terms of analysis of campaigns, one skilled in the art will recognize that the techniques described herein can be applied at any level of granularity for analysis of marketing initiatives, so as to analyze individual events, touches, or contact points, as well as analyzing overall campaigns.

Overall Architecture

Figure 2:
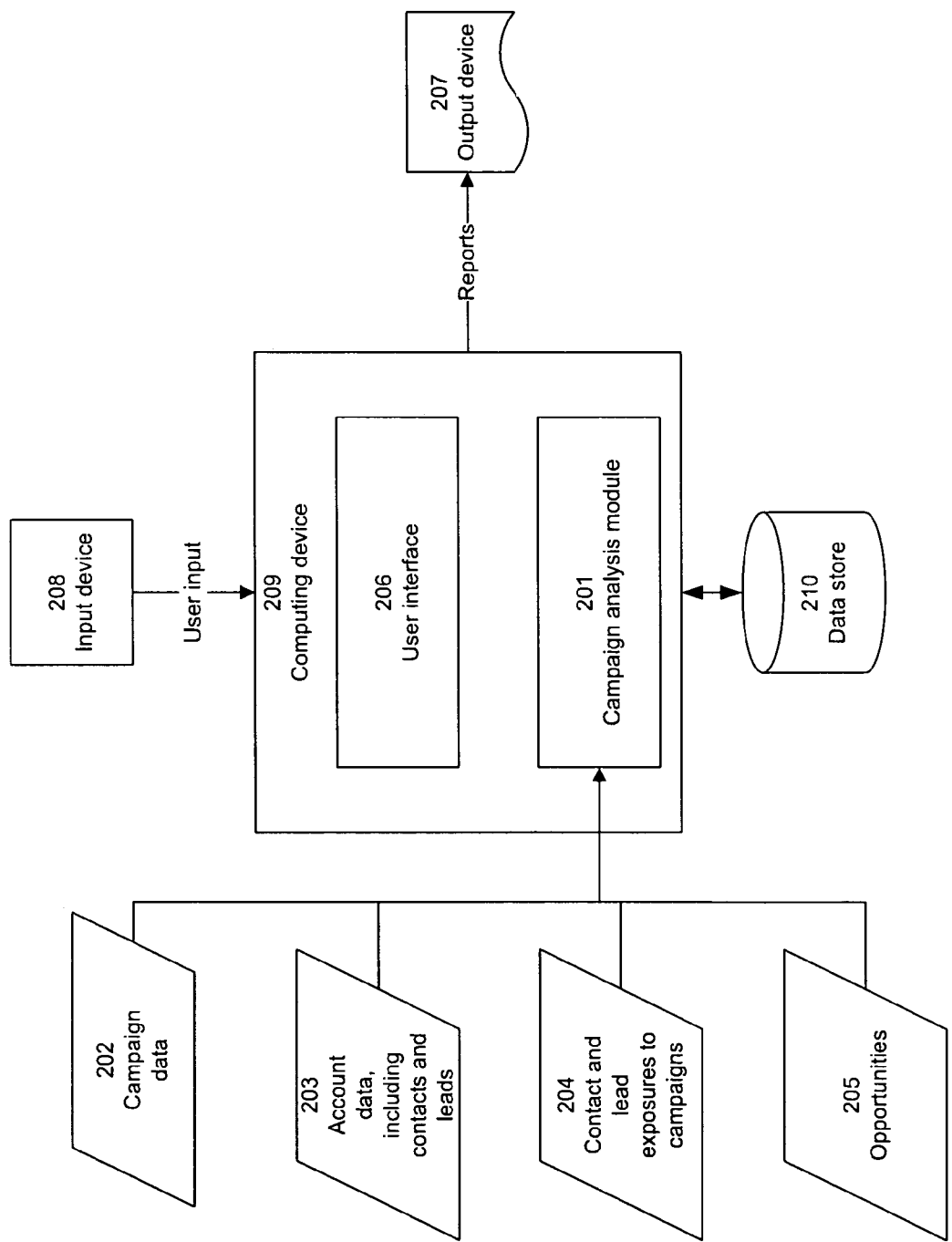
FIG. 2 is a block diagram depicting a system for practicing the present invention according to one embodiment.

Referring now to FIG. 2, there is shown a block diagram depicting a system for practicing the present invention according to one embodiment. In one embodiment, the method of the present invention, as described in more detail below, is performed by software running on a computing device 209. Computing device 209 includes a campaign analysis module 201 that receives: campaign data 202 describing various campaigns that have been presented to contacts and leads; account data 203 describing accounts including various individuals associated with such accounts and characterized as leads (potential customers) and contacts (leads that have been converted into customers); records 204 indicating which campaign(s) each contact and lead have been exposed to; and opportunities 205 describing definable events that move the seller closer to closing a deal.

Data store 210 provides a storage location for module 201 to store campaign information, contact/lead information, and analyses; data store 210 may be implemented, for example, using a conventional storage device or array of storage devices.

Input device 208 allows a user to interact with computing device 209 via user interface 206, so as to control the operation of module 201, select campaigns for analysis, select reports to be generated, define parameters, and the like. Once module 201 has performed its analysis, it generates reports for presentation to the user via output device 207, such as a screen or printer. In one embodiment, a separate report generator generates reports for presentation via output device 207.

One skilled in the art will recognize that the particular components and architecture shown in FIG. 2 are merely exemplary, and that the present invention can be practiced with systems having other components and architectures.

Method of Operation

Figure 3:
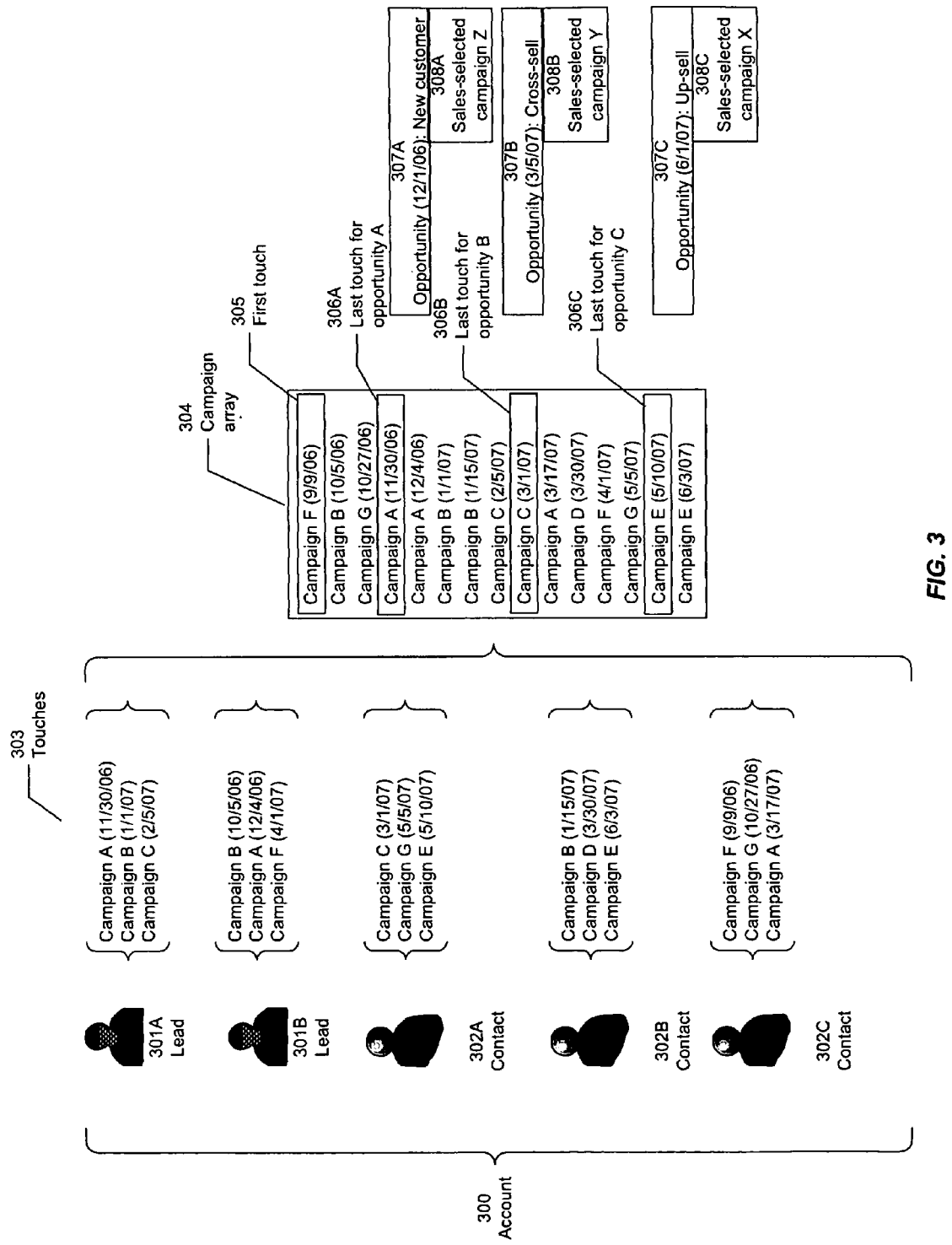
FIG. 3 depicts an example of the application of the method of FIG. 1 according to one embodiment of the present invention.

Referring now to FIG. 1, there is shown a flow diagram depicting a method of selecting campaigns for analysis according to one embodiment of the present invention. Referring also to FIG. 3, there is shown an example of the depicted method, for illustrative purposes.

Module 201 receives 101 information describing lead 301 and contact 302 exposures to marketing campaigns. These exposures are also known as "touches" 203. In the example of FIG. 3, two leads 301A, 301B are shown, along with three contacts 302A, 302B, 303C. Leads are prospective customers, while contacts are leads that have been formally converted to customers. In the example of FIG. 3, the depicted leads and contacts are all associated with a single account 300.

A list of touches 303 for each lead and contact is shown; each touch 303 indicates which campaign the lead/contact was exposed to, and the date of the exposure.

A particular example of a marketing touch 303 would be an email message sent to a lead 301. The lead 301 receives the email message and interacts with it; this interaction might include, for example, downloading some marketing materials from a link in the email message. Module 201 associates a campaign identifier for the marketing materials with the lead 301, and stores the association as a touch 303 within a database, specifically within a contact record for the lead 301. The database might also have associations of other touches 303 with other leads 301 or contacts 303 at the same account 300.

Based on the received information, module 201 builds 102 an account campaign array 304. In one embodiment, array 304 is a chronological representation of the touches 203 that have been identified in connection with the various leads 301 and contacts 302. Array 304 can be stored, for example, in data store 210.

Module 201 identifies 104 opportunities 307 resulting from the various campaigns. Once an opportunity 307 is recognized as having occurred, for example as an event that indicates the lead 301 has moved closer to closing a deal, a record representing the opportunity 307 is stored, including a date, nature of the opportunity, and other pertinent information.

As indicated above, an opportunity can be any definable event. In the example of FIG. 3, three opportunities 307 are identified: opportunity 307A where a new customer is brought in; opportunity 307B where a cross-sell takes place; and opportunity 307C where an up-sell takes place. Dates are indicated for each opportunity.

A first touch 305 is identified 105 for account 300. First touch 305 identifies the campaign that originated the account. In the example of FIG. 3, first touch 305 is identified as campaign F, which appears first in campaign array 304 and indicates a date of Sep. 9, 2006. This represents the initial contact with account 200.

For each identified opportunity 307, a last touch 306 is identified. Last touch 306 represents the last campaign exposure that took place prior to the opportunity 307. In the example of FIG. 3, last touch 306A for opportunity 307A (new customer, occurring on Dec. 1, 2006) is identified as campaign A with a date of Nov. 30, 2006. Last touch 306B for opportunity 307B (cross-sell, occurring on Mar. 5, 2007) is identified as campaign C with a date of Mar. 1, 2007. Last touch 306C for opportunity 307C (up-sell, occurring on Jun. 1, 2007) is identified as campaign E with a date of May 10, 2007.

If appropriate, module 201 also receives sales-selected campaign(s) 107, indicating those campaigns that are of particular interest to the user. In one embodiment, the user can select campaigns of interest using input device 208. In the example of FIG. 3, the user selects three campaigns that were not analyzed automatically: campaign Z is selected as a sales-selected campaign associated with opportunity 307A, campaign Y is selected as a sales-selected campaign associated with opportunity 307B, and campaign X is selected as a sales-selected campaign associated with opportunity 307C.

Once the first touch 305, last touch 306, and sales-selected campaign(s) 307 have been identified, module 201 performs 108 a multi-campaign analysis to measure the effectiveness of the various identified campaigns in terms of their abilities to create opportunities 207. A multi-touch analysis can be employed, showing relevance of all campaigns in array 304 to each opportunity 307. Module 201 generates 109 one or more reports based on the analysis, as described in more detail below. These reports are then output 110, for example via output device 207.

In one embodiment, the present invention using a campaign sequence attribution algorithm that takes into account the effect of the various type of campaigns, thereby eliminating the overriding of different types of campaigns at critical junctures in the marketing sales process and subsequently the loss of key metrics related to each stage such as marketing costs, pipeline opportunity creation, sales values, ROI, and the like. In one embodiment, the campaign sequence attribution algorithm uses metadata associated with each campaign ID, along with timestamps indicating exposure dates, to evaluate the allocation of each of the various campaign types. The algorithm sorts campaigns according to exposure date, compares opportunity creation dates to the list of campaigns, and allocates campaign attribution accordingly.

Using the campaign sequence attribution algorithm, marketers can track different sequential aspects of a campaign. For example, a first campaign might drive visitors to a website, while another campaign might include promotion of a whitepaper or product launch. It is undesirable to allow the effect of the second campaign to override the effect of the first, as such an approaches causes the user to lose sight of which tactic drove them to the website. Rather, the method of the present invention facilitates tracking where the multiple attributes of a campaign can be measured so as not to override each other.

In one embodiment, campaigns are identified as belonging to one of three categories:
  External Campaign IDs: campaigns that tend to drive visitors to the website or point of contact with the company. Examples include online channels such as banners, email messages, e-newsletters, paid searches, search engine optimization (SEO), direct access to the website, or blogs. Additional examples include offline channels such as trade shows, direct mail, or tele-prospecting.
  Conversion (or "Internal") Campaign IDs: campaigns that tend to convert prospects to leads, or which convert leads to more qualified leads. Examples include white papers, product tours, guides, datasheets, webinars, or reports. These are campaigns that are presented once the lead has already entered the website, store, or other domain associated with the seller.
  Re-Touch Campaign IDs: campaigns that nurture existing leads or contacts, thus providing opportunities such as up-selling, cross-selling, and the like. Examples include automated email messages, automated telephony scripts, direct mail. Such campaigns also aid in retaining existing customers.

Thus, for example a newspaper advertisement or billboard that brings a prospective customer into a store (or to a website) is an external campaign. A special offer that is presented during the visit to the store or website is a conversion campaign.

By sorting into these categories, the present invention avoids overwriting or erasure of critical and uniquely measurable campaign junctures in the marketing and sales process. Specifically, this categorization enables an analysis to determine which external paid marketing campaigns bring visitors, leads, and contacts to a site or company, which conversion elements convert these visitors, leads, and contacts, and which campaign elements are effective for remarketing to the contacts to create both initial customer opportunities, and subsequent cross-sell (additional products), and up-sell opportunities (more of the same products).

In one embodiment, when analyzing the effectiveness of a conversion campaign, the present invention is able to perform first-touch, multi-touch, and last-touch analysis; for external campaigns, the invention also performs sales-selected campaign analysis. For either type of campaign, multi-touch campaign analysis serves to independently discern the effect of multiple touches.

In one embodiment, re-touch campaign analysis is performed in such a manner so as to avoid overriding analysis of previous external and/or conversion campaign touches. Thus, the system of the present invention tracks re-touch campaign touches separately from external and/or conversion campaign touches, so that the data from the re-touch campaign can be used in conjunction with data from original external campaign touches as well as and in conjunction with conversion campaign analysis.

Data Flow

Figure 4:
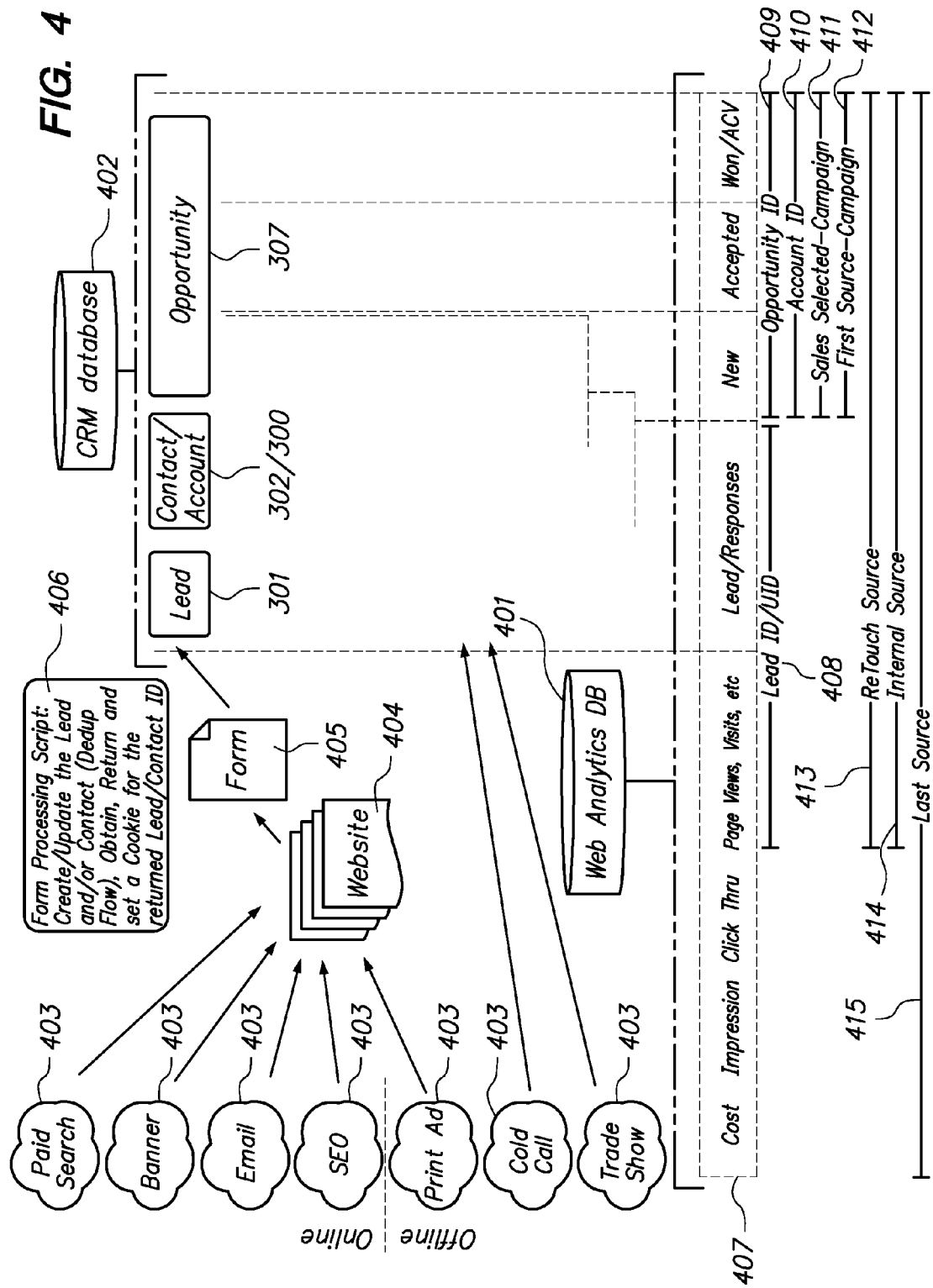
FIG. 4 is a block diagram depicting data flow across various components of the system according to one embodiment.

Referring now to FIG. 4, there is shown a block diagram depicting data flow across various components of the system according to one embodiment. CRM database 402 contains records describing leads 301, contacts 302, accounts 300, and opportunities 307. In one embodiment, CRM database 402 is a database associated with known Customer Relationship Management (CRM) software. Web analytics database 401 contains records 407 describing website visitation statistics, such as cost, impressions, click-throughs, page views, page visits, and the like. Database 401 can also contain records describing relationships between such statistics and current status of leads, responses, new opportunities, accepted opportunities, and actual cash value (ACV) of those opportunities that have been won. In one embodiment, web analytics database 401 is a database associated with known web analytics software.

As shown in FIG. 4, various campaigns 403 (including paid search, banners, email message, SEO, print ads, cold calls, trade shows, and the like) are converted into leads 301. For online campaigns 403, the conversion process may include driving prospects to website 404, where a form 405 is presented. Form processing script 406 accepts input from the prospect and creates or updates a record 408 describing the lead or contact. Form processing script 406 can also obtain, return, and set a cookie at the prospect's browser so that he or she can be recognized in the future.

In one embodiment, the system of the present invention runs various scripts in order to update and generate data to be stored in databases 401 and 402. An account sync script determines whether account 300 was sourced by a marketing department, and whether it was touched by any marketing campaigns, by traversing records of contacts 302 and leads 301 associated with account 300. If any marketing exposures (touches) are so identified, the system of the present invention stores such information in fields of database 402. An opportunity sync script determines, for each opportunity 307, which campaigns should be identified as first or last touches, described above. Identifiers for the first and last touch campaigns are stored in fields of database 402.

FIG. 4 depicts the various records that can be stored. Lead ID record 408 identifies a lead 301. It is created by form processing script 406 and lasts until the lead 301 is converted to a contact, at which time a Contact ID is used. Account ID record 410 stores information associated with an account after it has been converted. Opportunity ID record 409 stores information associated with an opportunity 307. Sales selected campaign 411 identifies one or more campaigns that have been identified by a user as being significant. First source campaign record 412 identifies the first campaign that was responsible for initiating a lead or account. Re-touch source 413 identifies campaigns that are intended to maintain or nurture contacts 302 and leads 301. Internal (also known as conversion) source campaign record 414 identifies campaigns intended to identify those onsite and offsite campaign promotions that convert the contacts into the database (i.e. webinars, whitepapers, free trials, and the like) and move existing leads closer to a sale. Last source campaign record 415 identifies a campaign that was the last touch before an opportunity 307.

In one embodiment, a multi-touch analysis can also be performed, wherein module 201 analyzes the aggregated effect of all campaigns to which the account was exposed. The multi-touch analysis also provides the sequence of campaign interactions and their relationships to the opportunities.

Reports

FIGS. 5A through 6D show various examples of reports that can be generated using the marketing analysis techniques of the present invention. In one embodiment, these reports can be presented to a user via output device 207, for example in step 110 of the method of FIG. 1, as described above. One skilled in the art will recognize that the particular layout and format of these reports are merely exemplary, and that many other arrangements are possible without departing from the essential characteristics of the invention.

Figure 5A:
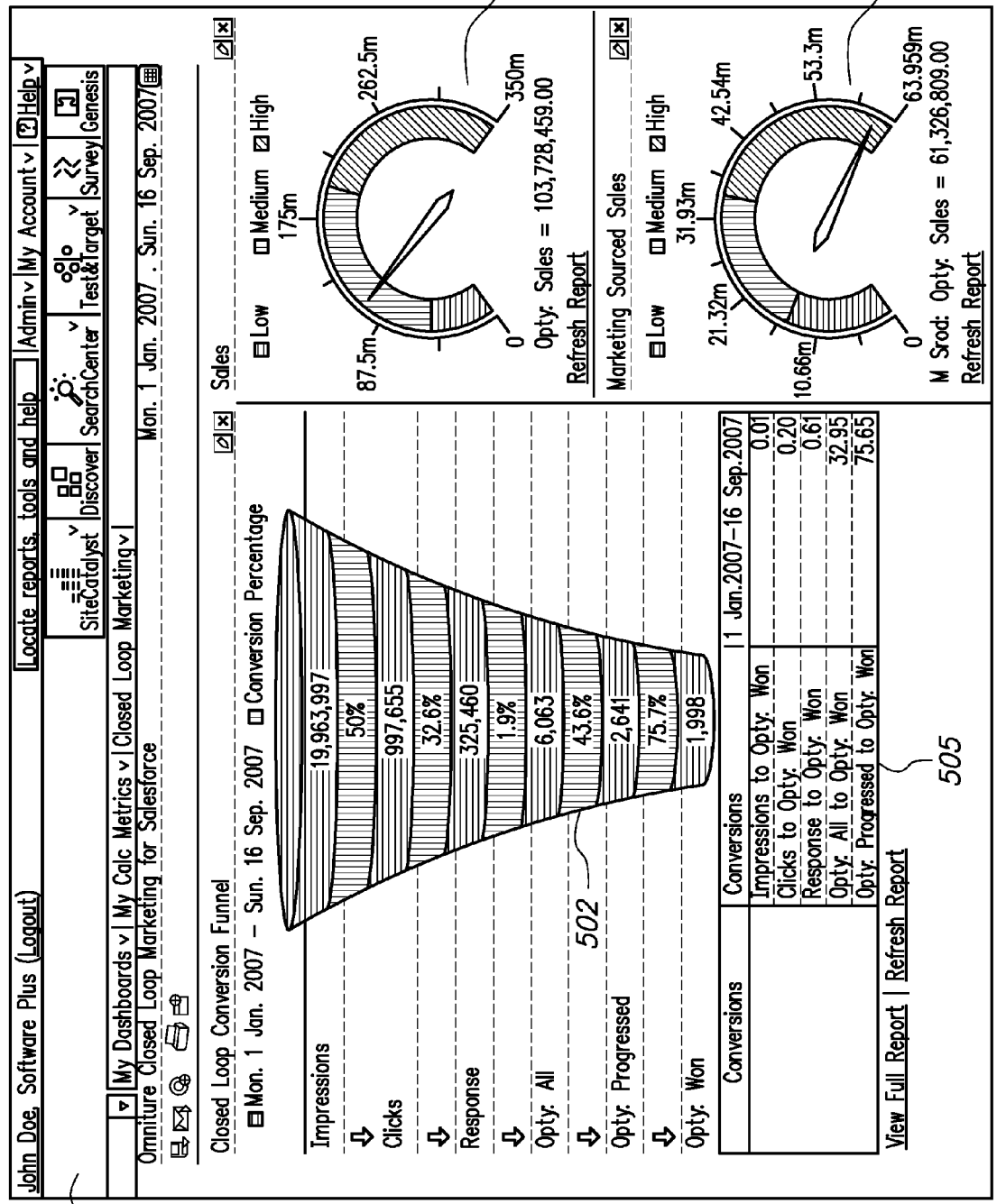
FIGS. 5A through 6D show examples of reports that can be generated using the marketing analysis techniques of the present invention.

Referring now to FIG. 5A, there is shown a closed loop conversion funnel report 500. Report 500 presents information obtained through the closed-loop marketing analysis described above, wherein multiple touches can be tracked and their effect can be analyzed. Funnel diagram 502 graphically depicts conversions from impressions, to clicks, to responses, to opportunities, to progressed opportunities, to won opportunities (i.e., closed deals). The conversions are also depicted numerically within funnel 502. Table 505 shows the percentage of prospects that have proceeded from each stage to the final "won opportunity" stage. Meter graph 503 shows total sales over a defined time period. Meter graph 504 shows marketing-sourced sales over the defined time period.

Figure 5B:
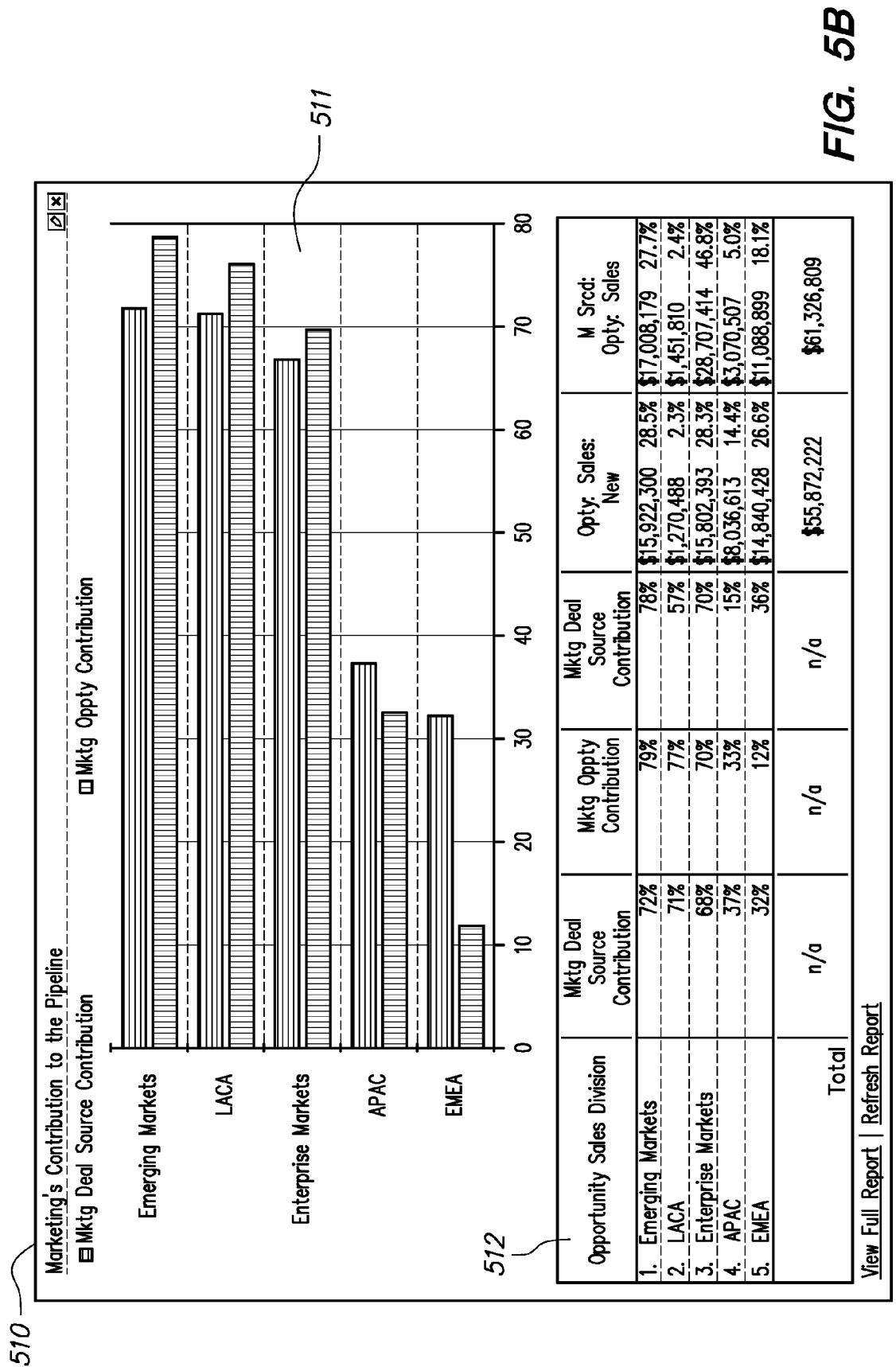

Referring now to FIG. 5B, there is shown a marketing contribution report 510. Report 510 presents information obtained through the closed-loop marketing analysis described above, wherein multiple touches can be tracked and their effect can be analyzed. Graph 511 shows the relative contributions of marketing deal sources and marketing opportunities in various sales divisions. Table 512 shows, for each sales division, a numeric marketing deal source contribution (specified as a number of closed opportunities), a numeric marketing opportunity contribution (specified as a number of created opportunities), a marketing sales source contribution (specified in currency values), a total amount of new sales opportunities (specified as a dollar/currency amount and percentage), and a total amount of marketing-sourced sales opportunities (specified as a dollar amount and percentage). These relate to the invention by combining online and offline marketing campaign metrics to metrics in the sales funnel.

Figures 1, 5C:
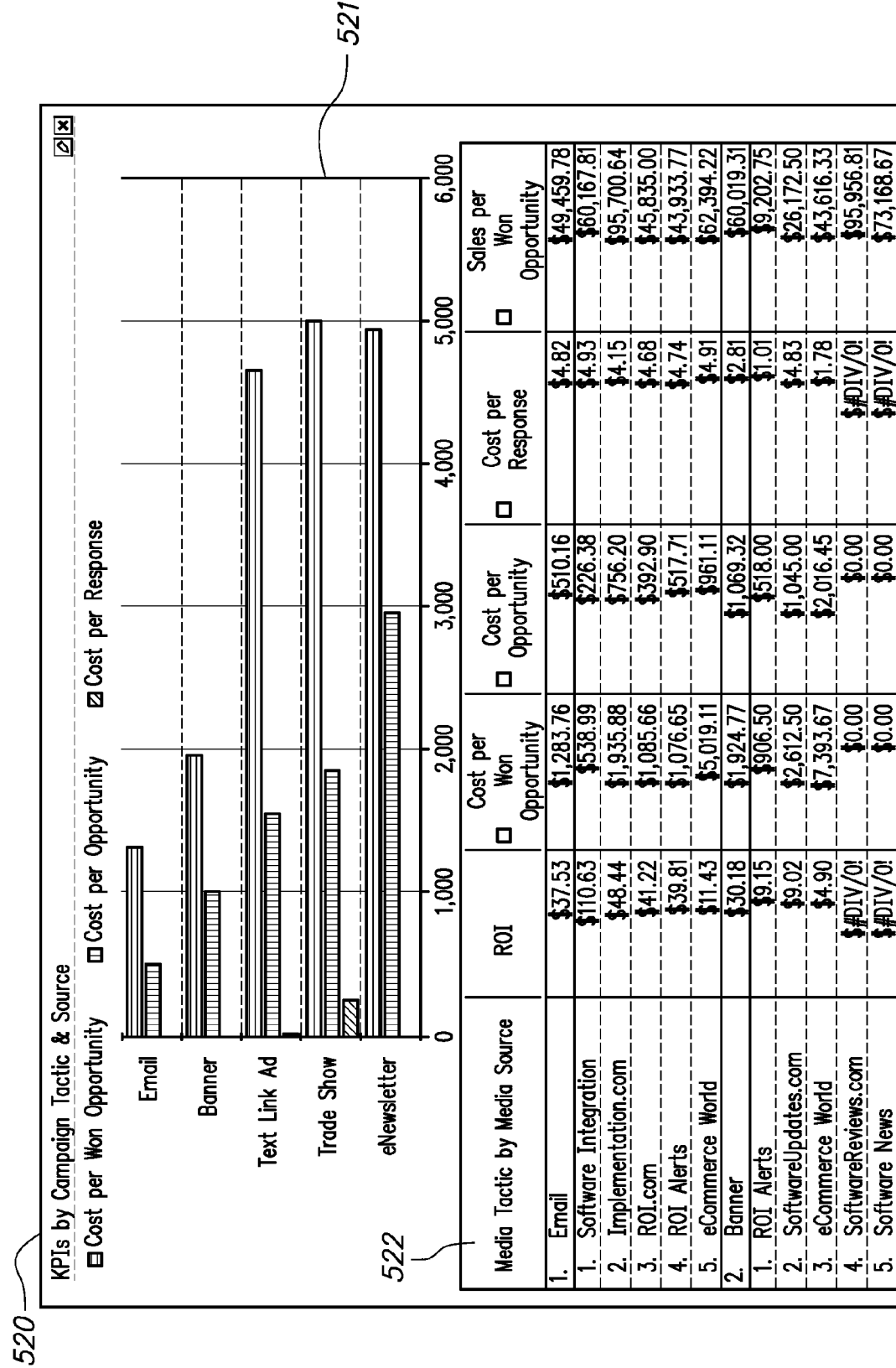

Referring now to FIG. 5C, there is shown report 520 depicting key performance indicators (KPIs) by campaign tactic and source. Report 520 presents information obtained through the closed-loop marketing analysis described above, wherein multiple touches can be tracked and their effect can be analyzed. Graph 521 shows, for various types of marketing sources, a cost per won opportunity, cost per opportunity, and cost per response. Table 522 shows, for each marketing tactic, a breakdown of specific tactics categorized by source.

In one embodiment, a tactic is a component of a campaign typically represented by online and/or offline channels (email, paid search, SEO, direct mail, banners, and the like). For each tactic, table 522 shows ROI, cost per won opportunity, cost per opportunity, cost per response, and sales per won opportunity.

Figures 1, 5D:
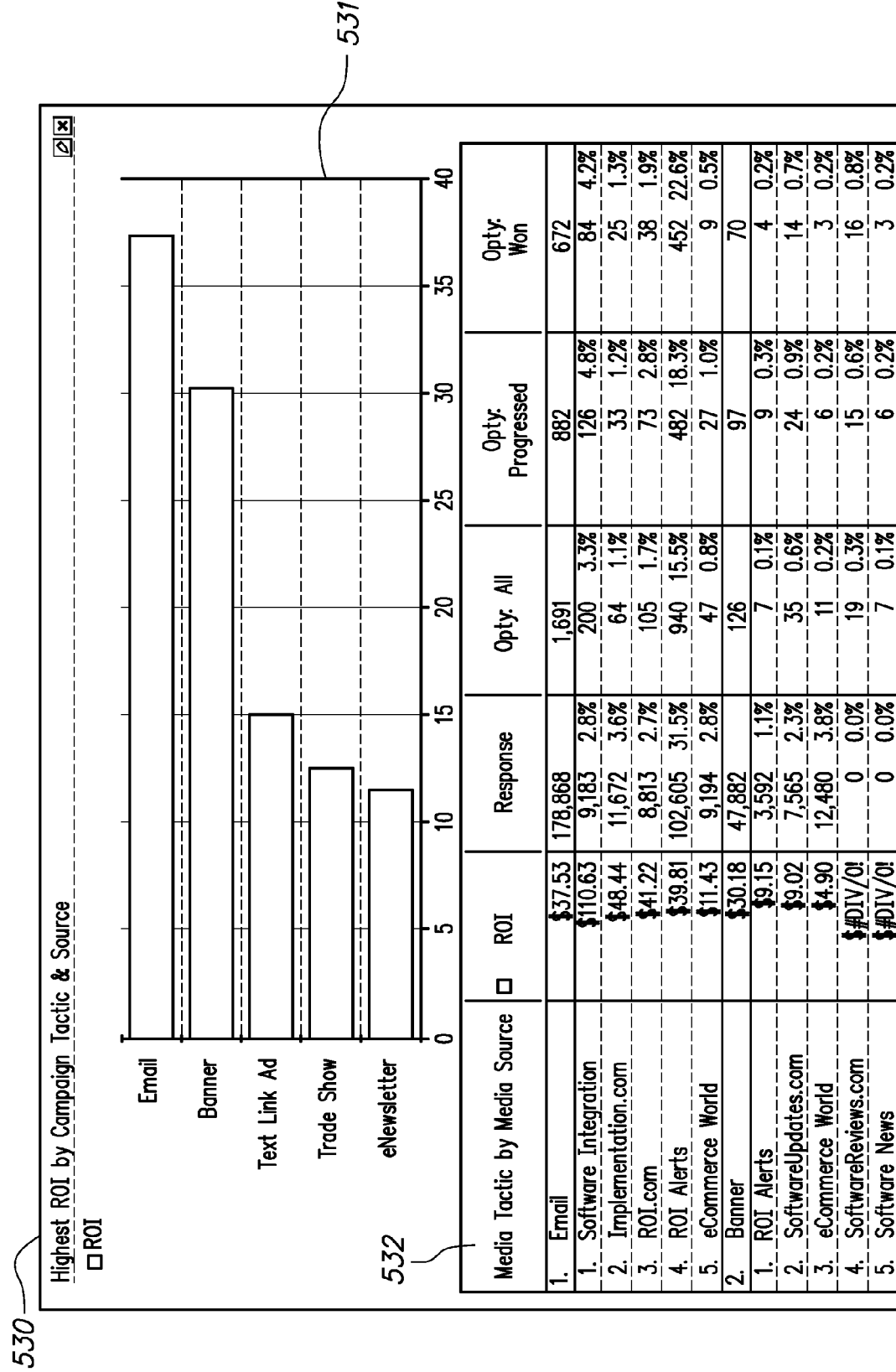

Referring now to FIG. 5D, there is shown report 530 depicting ROI by campaign tactic and source. Report 530 presents information obtained through the closed-loop marketing analysis described above, wherein multiple touches can be tracked and their effect can be analyzed. Graph 531 shows ROI for various types of marketing sources. Table 532 shows a breakdown of specific tactics categorized by source. For each tactic, table 532 shows ROI, number of responses (shown numerically and as a percentage), number of opportunities (shown numerically and as a percentage), number of progressed opportunities (shown numerically and as a percentage), and number of won opportunities (shown numerically and as a percentage).

Figures 1, 5E:
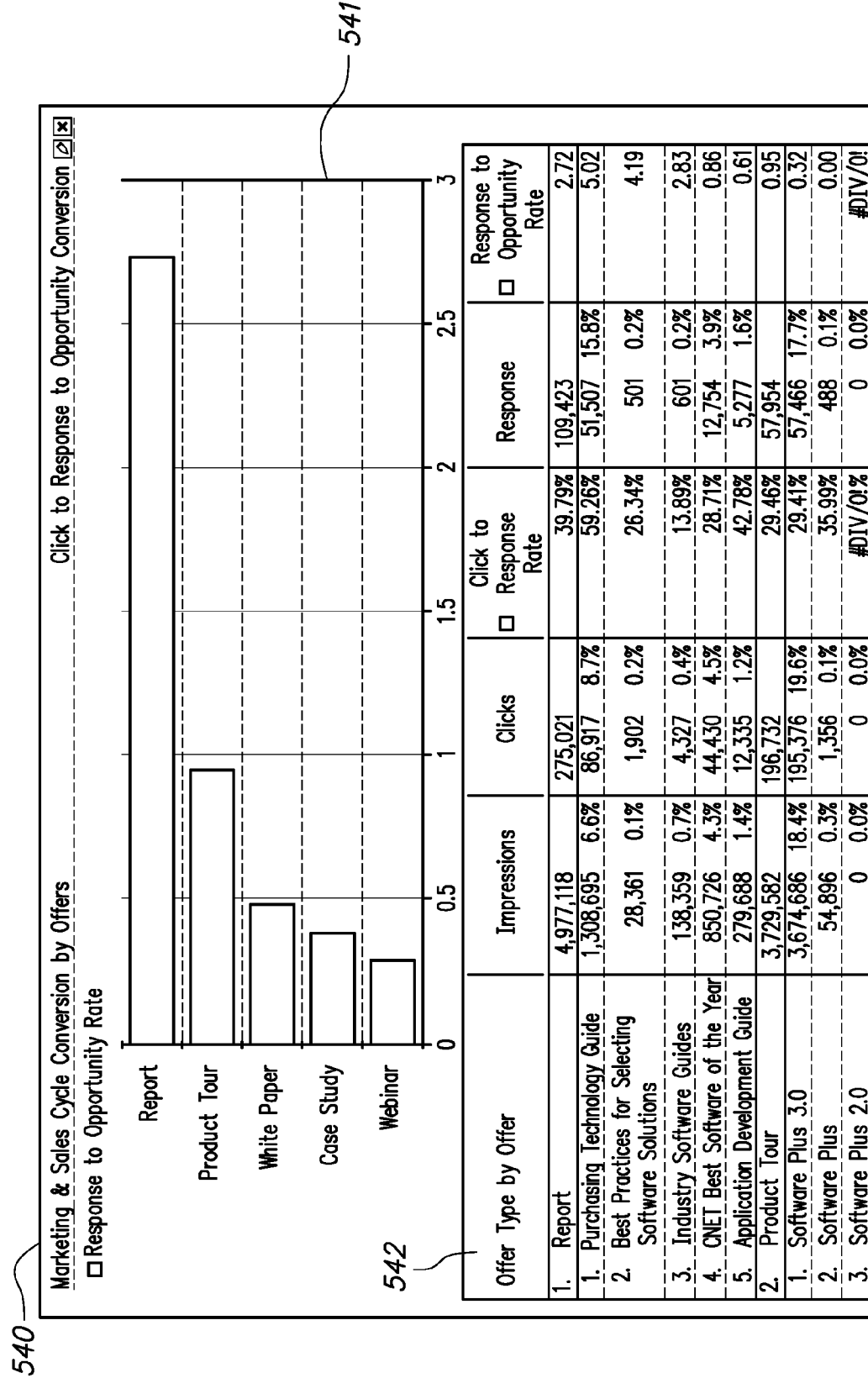

Referring now to FIG. 5E, there is shown report 540 depicting marketing and sales cycle conversion by offers. Report 540 presents information obtained through the closed-loop marketing analysis described above, wherein multiple touches can be tracked and their effect can be analyzed. Graph 541 shows a response rate for various offer types. Table 541 shows a breakdown of specific offers categorized by source. For each offer, table 542 shows the number of impressions (shown numerically and as a percentage), number of clicks (shown numerically and as a percentage), a click to response rate, number of responses (shown numerically and as a percentage), and a response to opportunity rate.

Figure 5F:
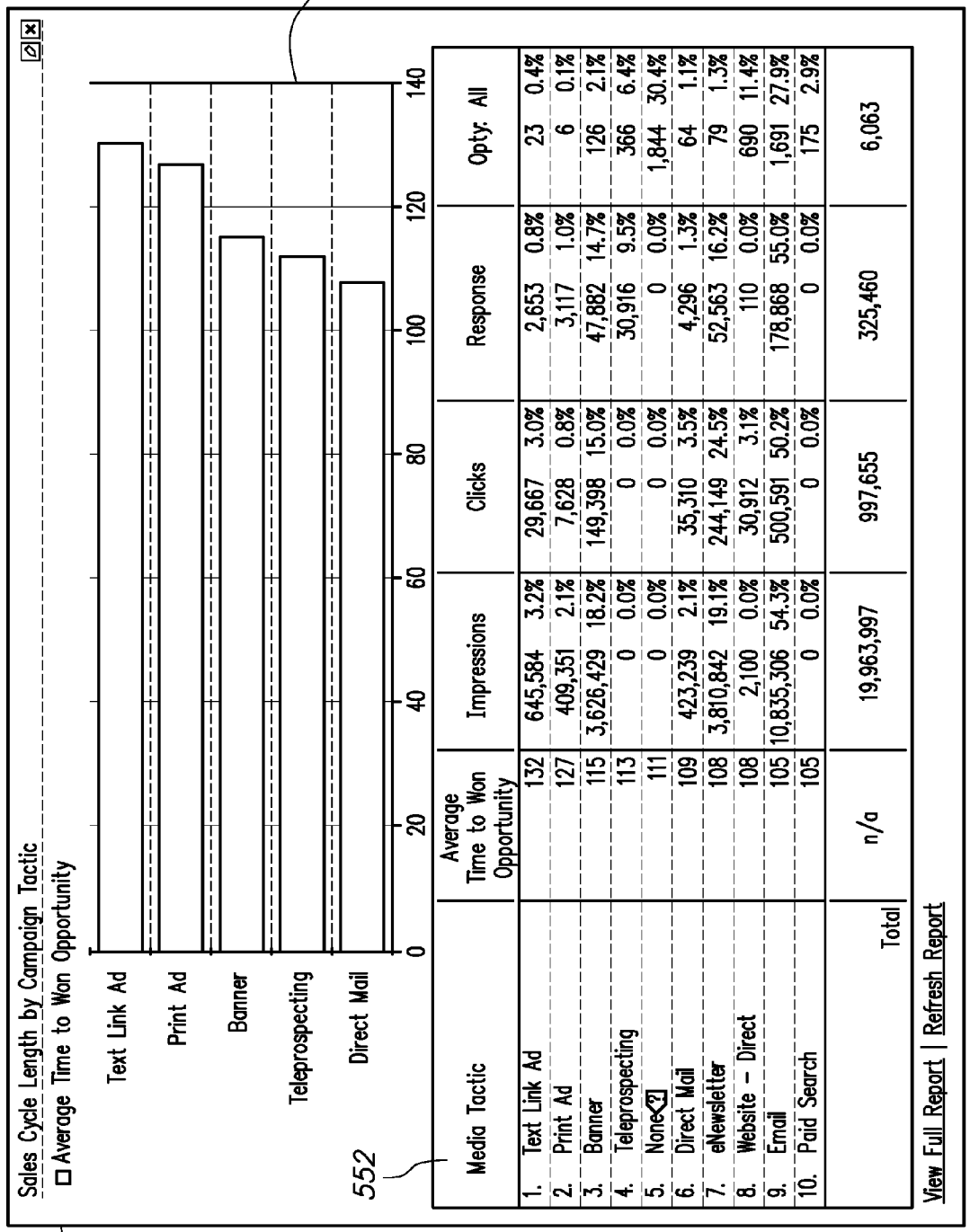

Referring now to FIG. 5F, there is shown report 550 depicting sales cycle length by campaign tactic. Report 550 presents information obtained through the closed-loop marketing analysis described above, wherein multiple touches can be tracked and their effect can be analyzed. Graph 551 shows the average time to won opportunity for various campaign tactics. Table 552 shows, for each tactic, the average time to won opportunity, number of impressions (shown numerically and as a percentage), number of clicks (shown numerically and as a percentage), number of responses (shown numerically and as a percentage), and number of opportunities (shown numerically and as a percentage).

Referring now to FIG. 5G, there is shown report 560 depicting largest deal sizes by campaign tactic. Report 560 presents information obtained through the closed-loop marketing analysis described above, wherein multiple touches can be tracked and their effect can be analyzed. Report 560 shows, for each tactic, the number of impressions (shown numerically and as a percentage), number of clicks (shown numerically and as a percentage), number of responses (shown numerically and as a percentage), and number of opportunities (shown numerically and as a percentage).

Figure 6A:
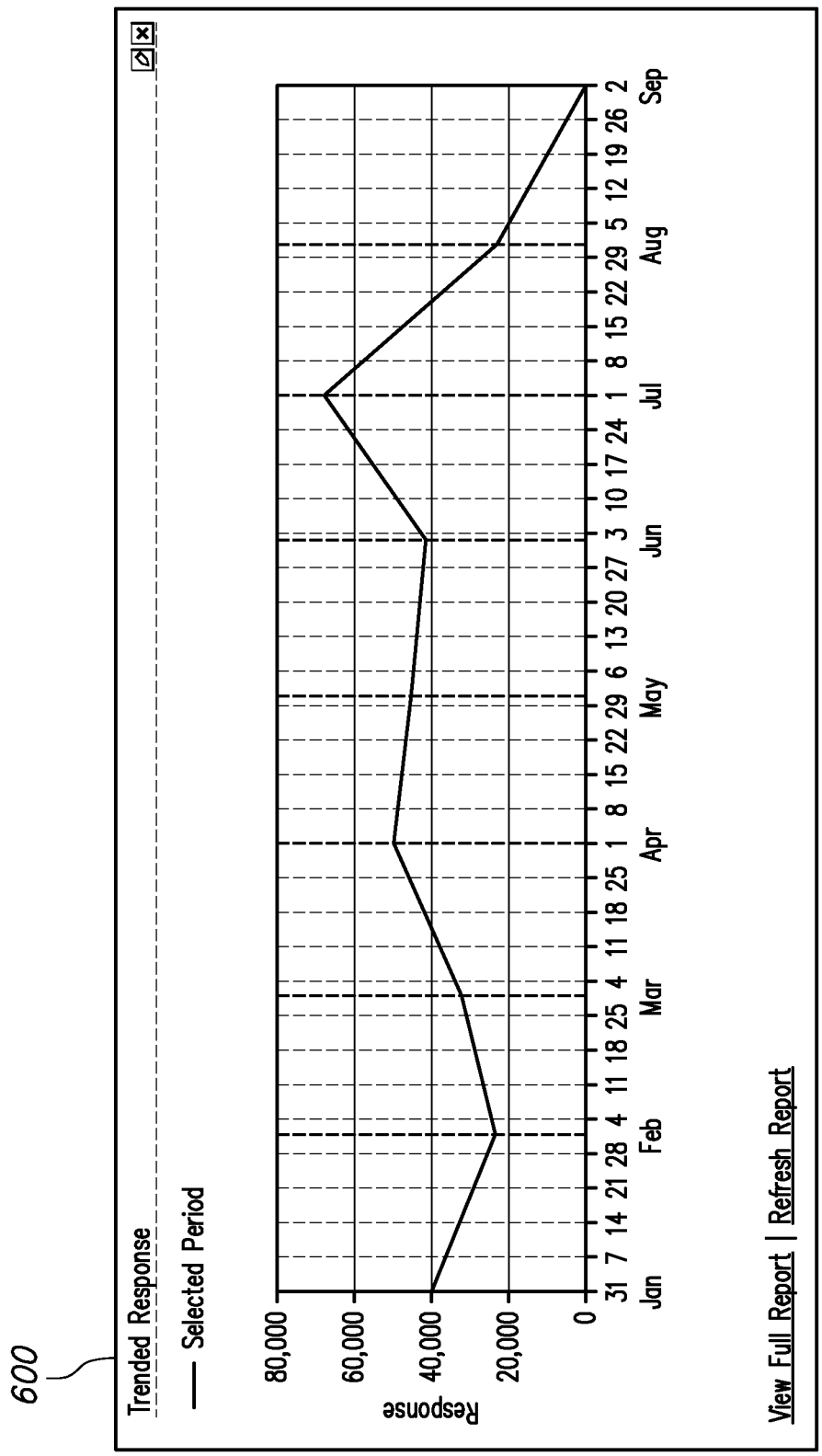

Referring now to FIG. 6A, there is shown a graph 600 depicting trended response. A timeline is depicted; for each time period, a total number of responses is plotted. This allows a user to detect trends in the number of responses received as various campaigns are run.

Figure 6B:
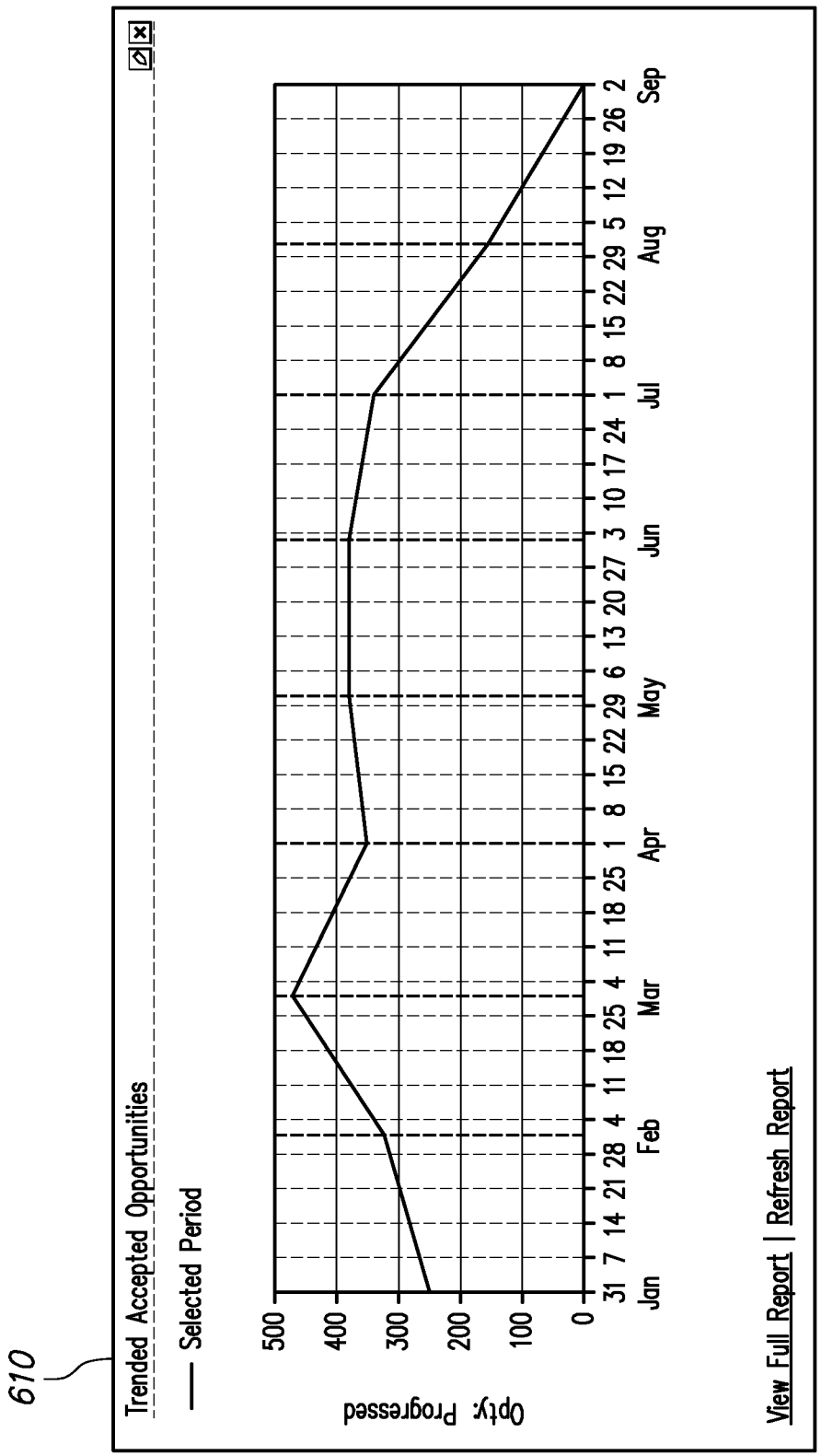

Referring now to FIG. 6B, there is shown a graph 610 depicting trended accepted opportunities. A timeline is depicted; for each time period, a total number of progressed opportunities is plotted. This allows a user to detect trends in the number of progressed opportunities as various campaigns are run.

Figure 6C:
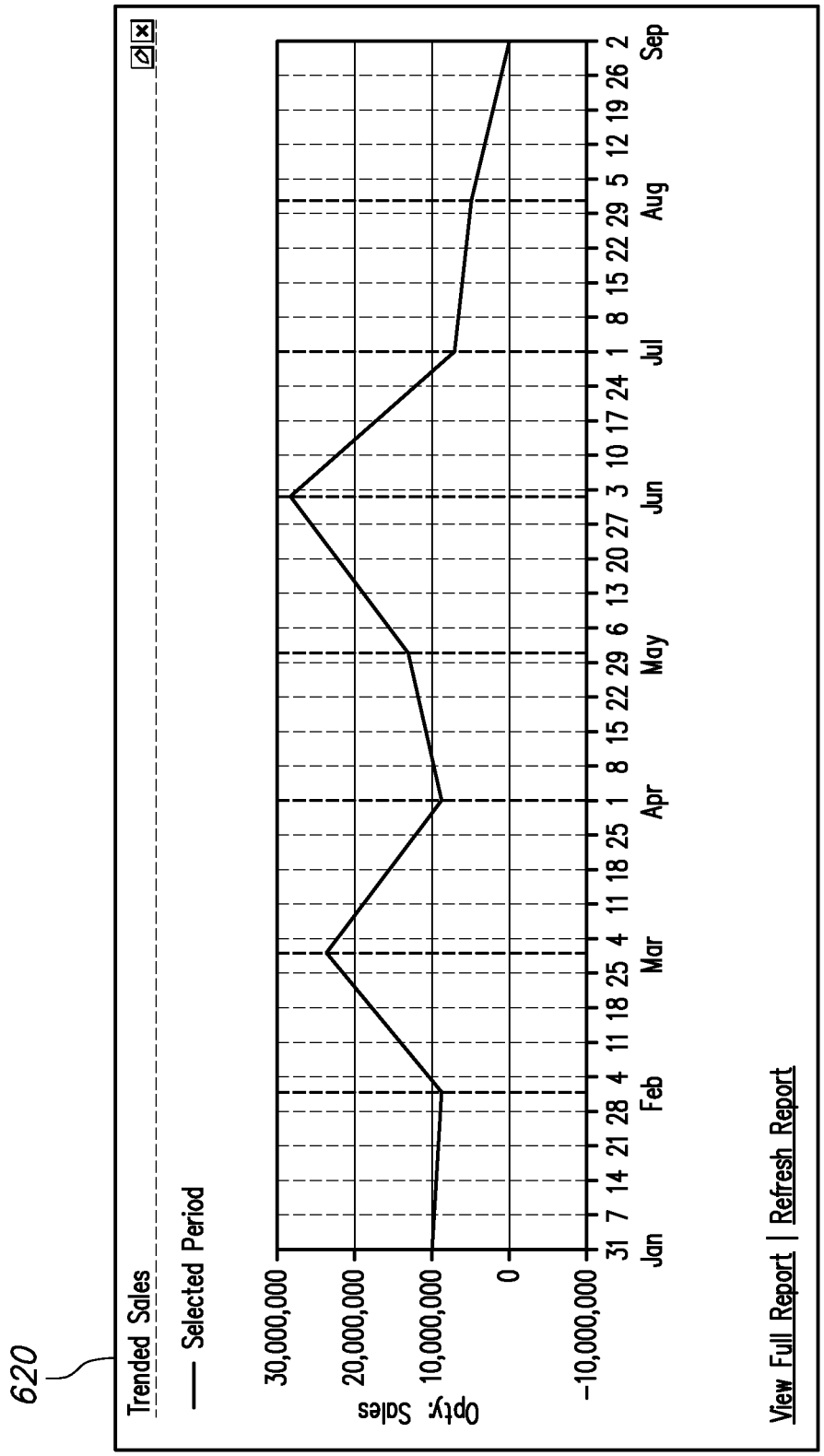

Referring now to FIG. 6C, there is shown a graph 620 depicting trended sales. A timeline is depicted; for each time period, a total number of sales is plotted. This allows a user to detect trends in the number of sales as various campaigns are run.

Figure 6D:
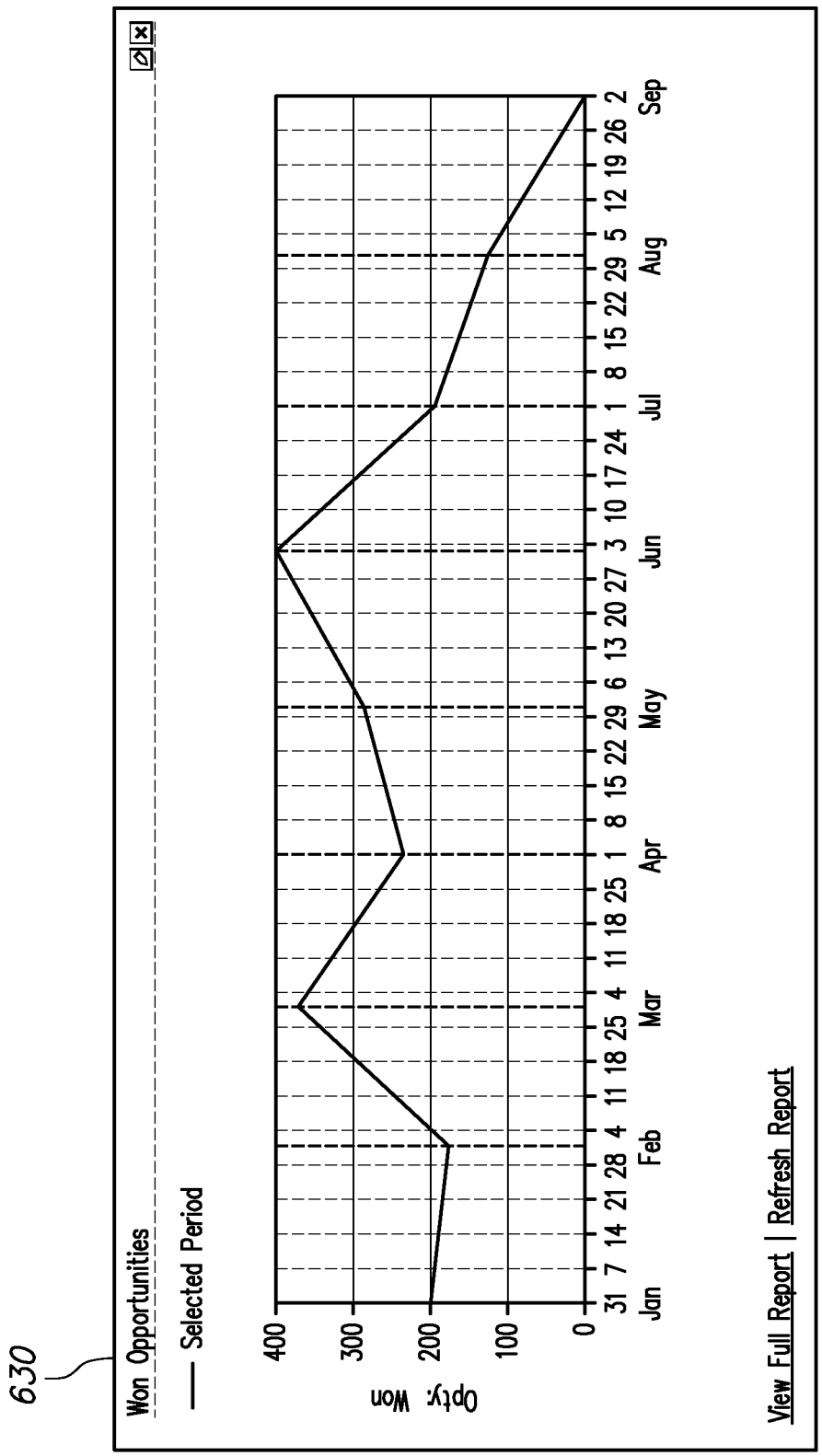

Referring now to FIG. 6D, there is shown a graph 630 depicting won opportunities. A timeline is depicted; for each time period, a total number of won opportunities is plotted. This allows a user to detect trends in the number of won opportunities as various campaigns are run.

Integration Methodology

Figure 7:
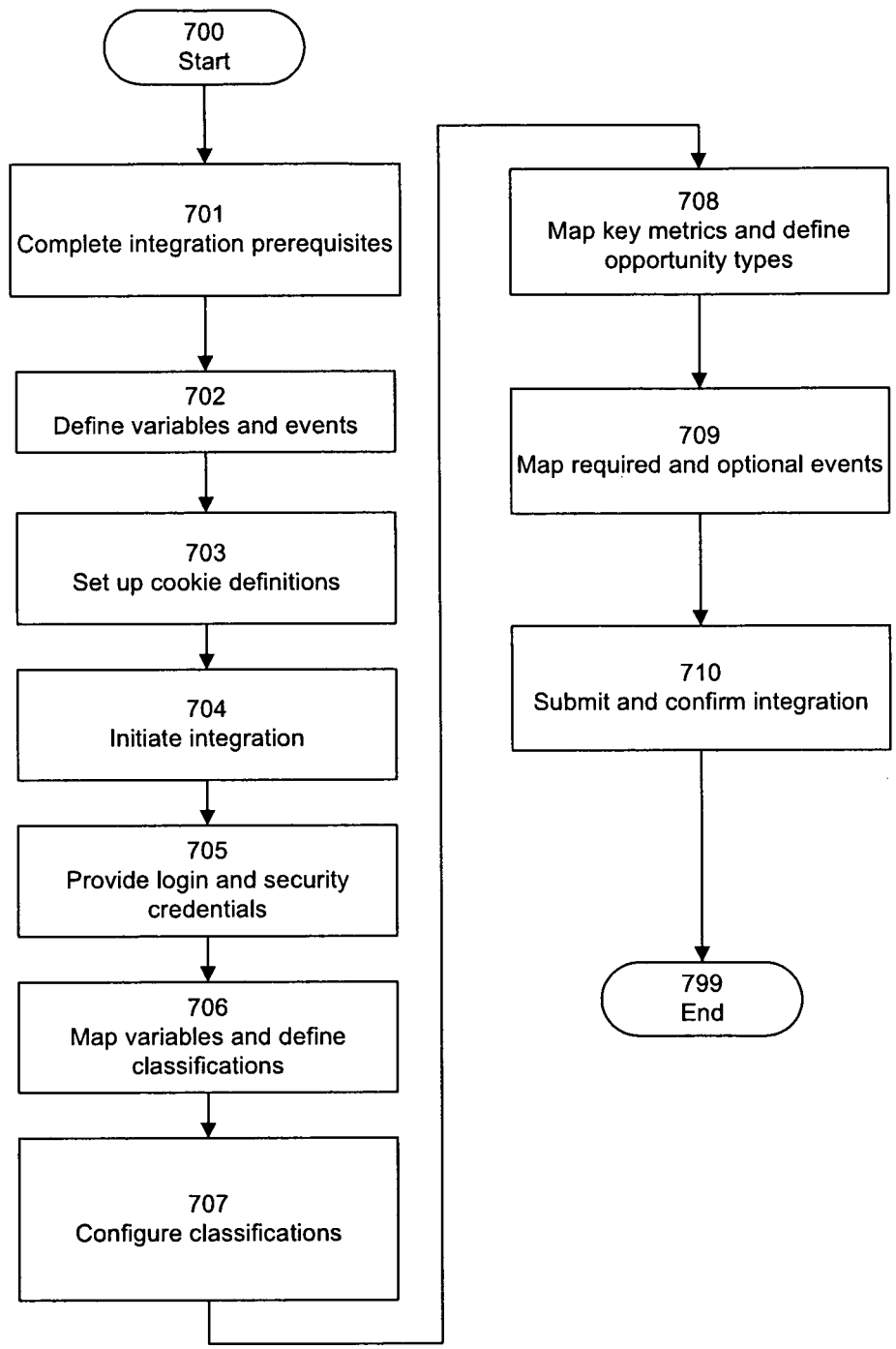
FIG. 7 is a flowchart depicting a method of integrating the functionality of the present invention into CRM software.

In one embodiment, the system of the present invention is integrated into existing CRM software. Referring now to FIG. 7, there is shown a flowchart depicting a method of integrating the functionality of the present invention into CRM software. One skilled in the art will recognize that the particular method is exemplary, and that some steps may be omitted, added, or changed.

First, the user completes 701 integration prerequisites. This includes determining that the appropriate types and versions of CRM software and web analytics software are being used, and that these software applications are properly configured to accept the integration.

Next, the user defines 702 variables and events to be used in connection with the analysis. Table 1 depicts examples:

TABLE 1

| Variables and Events | | | |
|---|---|---|---|
| Variable or Event | Friendly Name | Population Method | Notes |
| Variables | | | |
| s.campaign | Tracking Code | Query string parameter and getQueryParam plug-in | |
| eVar A | Lead ID | | |
| eVar B | Opportunity ID | | |
| eVar C | Account ID | | |
| eVar D | Creator ID | | |
| eVar E | Campaign - Last | | |
| eVar F | Campaign - First | | |
| eVar E | Campaign - Internal | | |

TABLE 1-continued

Variables and Events

| Variable or Event | Friendly Name | Population Method | Notes |
|---|---|---|---|
| eVar G | Campaign - Retouch | | |
| eVar H | Campaign - Multi-touch | | |

Standard Events

| | | | |
|---|---|---|---|
| eventA | Opportunity: All | Periodic metric feed from CRM software in Numeric format. | This shows the count of all opportunities that have been accepted by Sales. This indicates a conversion event from "Response" to Opportunity.Numeric |
| eventB | Opportunity: Progressed | Periodic metric feed from CRM software in Numeric format | This shows the count of all opportunities that have moved to a stage equal to or greater than the stage selected as the "progressed" trigger. |
| eventC | Opportunity: New Customer | Numeric | |
| eventD | Opportunity: Existing Customer: Cross-Sell | Numeric | |
| eventE | Opportunity: Existing Customer: Up-Sell | Numeric | |
| eventF | Opportunity: Won | Numeric | |
| eventG | Opportunity: Lost | Numeric | |
| eventH | Opportunity: Sales | Currency | |
| eventI | Opportunity: Won: New Customer | Numeric | |
| eventJ | Opportunity: Won: Existing Customer: Cross-Sell | Numeric | |
| eventK | Opportunity: Won: Existing Customer: Up-Sell | Numeric | |
| eventL | Opportunity: Sales: New Customer | Currency | |
| eventM | Opportunity: Sales: Existing Customer: Cross-Sell | Currency | |
| eventN | Opportunity: Sales: Existing Customer: Up-Sell | Currency | |
| eventO | Opportunity: Time-To-Close | Numeric | |

Campaign Events

| | | | |
|---|---|---|---|
| eventP | Campaign Touch: Account | Numeric | |
| eventQ | Campaign Touch: Opportunity | Numeric | |
| eventR | Offline Lead | Numeric | |
| eventS | Expected Revenue | Numeric | |
| EventT | Actual Cost | Numeric | |
| eventU | Budgeted Cost | Numeric | |
| eventV | Impressions | Numeric | |
| eventW | Email Opens | Numeric | |

Marketing Sourced Events

| | | | |
|---|---|---|---|
| eventX | Marketing Sourced: Opportunity: All | Numeric | |
| eventY | Marketing Sourced: Opportunity: Progressed | Numeric | |
| eventZ | Marketing Sourced: Opportunity: New Customer | Numeric | |
| eventAA | Marketing Sourced: Opportunity: Existing Customer: Cross-Sell | Numeric | |
| eventBB | Marketing Sourced: Opportunity: Existing Customer: Up-Sell | Numeric | |
| eventCC | Marketing Sourced: Opportunity: Won | Numeric | |
| eventDD | Marketing Sourced: Opportunity: Lost | Numeric | |
| eventEE | Marketing Sourced: Opportunity: Sales | Currency | |

TABLE 1-continued

Variables and Events

| Variable or Event | Friendly Name | Population Method | Notes |
|---|---|---|---|
| eventFF | Marketing Sourced: Opportunity: Won: New Customer | Numeric | |
| eventGG | Marketing Sourced: Opportunity: Won: Existing Customer: Cross-Sell | Numeric | |
| eventHH | Marketing Sourced: Opportunity: Won: Existing Customer: Up-Sell | Numeric | |
| eventII | Marketing Sourced: Opportunity: Sales: New Customer | Currency | |
| eventJJ | Marketing Sourced: Opportunity: Sales: Existing Customer: Cross-Sell | Currency | |
| eventKK | Marketing Sourced: Opportunity: Sales: Existing Customer: Up-Sell | Currency | |
| eventLL | Marketing Sourced: Opportunity: Time-To-Close | Numeric | |
| Marketing Touched Events ||||
| eventMM | Marketing Touched: Opportunity: All | Numeric | |
| eventNN | Marketing Touched: Opportunity: Progressed | Numeric | |
| eventOO | Marketing Touched: Opportunity: New Customer | Numeric | |
| eventPP | Marketing Touched: Opportunity: Existing Customer: Cross-Sell | Numeric | |
| eventQQ | Marketing Touched: Opportunity: Existing Customer: Up-Sell | Numeric | |
| eventRR | Marketing Touched: Opportunity: Won | Numeric | |
| eventSS | Marketing Touched: Opportunity: Lost | Numeric | |
| | Marketing Touched: Opportunity: Sales | Currency | |
| eventUU | Marketing Touched: Opportunity: Won: New Customer | Numeric | |
| eventVV | Marketing Touched: Opportunity: Won: Existing Customer: Cross-Sell | Numeric | |
| eventWW | Marketing Touched: Opportunity: Won: Existing Customer: Up-Sell | Numeric | |
| eventXX | Marketing Touched: Opportunity: Sales: New Customer | Currency | |
| eventYY | Marketing Touched: Opportunity: Sales: Existing Customer: Cross-Sell | Currency | |
| eventZZ | Marketing Touched: Opportunity: Sales: Existing Customer: Up-Sell | Currency | |
| eventAAA | Marketing Touched: Opportunity: Time-To-Close | Numeric | |

Next, cookie definitions are set up 703. In this set, parameters are configured so as to ensure that web pages will property track the various campaigns. In one embodiment, each campaign (such as external, conversion, and re-touch) has its URL parameter and cookie.

Next, integration with the CRM software and the web analytics software is initiated 704.

Next, the user provides 705 login and security credentials for the CRM software, so as to allow the system of the present invention to acquire data from the CRM software as needed. In one embodiment, the login and security information is securely stored for later use by the system of the present invention.

Next, the user maps 706 fields from the CRM software to appropriate variables in the web analytics software. This ties opportunity metrics from the CRM software to appropriate campaign events being analyzed by the web analytics software. The mapping can be manual or automatic, or some combination thereof.

Next, the user specifies 707 what classifications should be configured for the various variables to be analyzed. Classifications will be made available in reports, as shown in the above-discussed examples. The classifications can be a combination of existing classifications in the CRM software and/or the web analytics software.

Next, the user maps 708 key metrics, including CRM fields that have been previously configured. The user can also differentiate among different types of opportunities, such as new customer opportunities, cross-sell opportunities, and up-sell opportunities.

Next, the user maps 709 required and optional events for analysis. A number of metric types (as defined for the CRM software) are mapped to events in the web analytics software.

The user then submits and confirms 710 the integration.

In the above description, for purposes of explanation, numerous specific details are set forth in order to provide a thorough understanding of the invention. It will be apparent, however, to one skilled in the art that the invention can be practiced without these specific details. In other instances, structures and devices are shown in block diagram form in order to avoid obscuring the invention.

Reference in the specification to "one embodiment" or "an embodiment" means that a particular feature, structure, or characteristic described in connection with the embodiment is included in at least one embodiment of the invention. The appearances of the phrase "in one embodiment" in various places in the specification are not necessarily all referring to the same embodiment.

Some portions of the detailed description are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the discussion, it is appreciated that throughout the description, discussions utilizing terms such as "processing" or "computing" or "calculating" or "determining" or "displaying" or the like, refer to the action and processes of a computer system, or similar electronic computing device, that manipulates and transforms data represented as physical (electronic) quantities within the computer system's registers and memories into other data similarly represented as physical quantities within the computer system's memories or registers or other such information storage, transmission or display devices.

The present invention also relates to an apparatus for performing the operations herein. This apparatus may be specially constructed for the required purposes, or it may comprise a general-purpose computer selectively activated or reconfigured by a computer program stored in the computer. Such a computer program may be stored in a computer readable storage medium, such as, but is not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions, and each coupled to a computer system bus.

The algorithms and displays presented herein are not inherently related to any particular computer, network of computers, or other apparatus. Various general-purpose systems may be used with programs in accordance with the teachings herein, or it may prove convenient to construct a more specialized apparatus to perform the required method steps. The required structure for a variety of these systems appears from the description. In addition, the present invention is not described with reference to any particular programming language. It will be appreciated that a variety of programming languages may be used to implement the teachings of the invention as described herein.

As will be understood by those familiar with the art, the invention may be embodied in other specific forms without departing from the spirit or essential characteristics thereof. For example, the particular architectures depicted above are merely exemplary of one implementation of the present invention. The functional elements and method steps described above are provided as illustrative examples of one technique for implementing the invention; one skilled in the art will recognize that many other implementations are possible without departing from the present invention as recited in the claims. Likewise, the particular capitalization or naming of the modules, protocols, features, attributes, or any other aspect is not mandatory or significant, and the mechanisms that implement the invention or its features may have different names or formats. In addition, the present invention may be implemented as a method, process, user interface, computer program product, system, apparatus, or any combination thereof. Accordingly, the disclosure of the present invention is intended to be illustrative, but not limiting, of the scope of the invention, which is set forth in the following claims.

What is claimed is:

1. A method for analyzing online exposures to internet marketing campaigns using an online analytics tool integrated with a customer relationship management (CRM) system, the method comprising:

executing, by computing devices, program code that, when executed by a processing device, causes the processing device to perform operations comprising:

integrating the online analytics tool and the CRM system into a platform with a common point-of-interface by (i) configuring the online analytics tool to retrieve CRM data from the CRM system and (ii) creating a mapping between the CRM data and website visitation statistics tracked by the online analytics tool, the CRM system comprising a CRM database storing records of contacts and leads associated with an account, the online analytical tool comprising a web analytics database storing the website visitation statistics for the contacts and leads associated with the account, wherein the website visitation statistics are received via cookies set at browsers executed by multiple computing devices associated with the contacts and leads;

identifying, with the integrated platform and from marketing exposure data that uses the mapping between the integrated online analytics tool and the CRM system, exposures of contacts or leads associated with the account to any of a plurality of internet marketing campaigns;

identifying, with the integrated platform and from the website visitation statistics, a plurality of closed transactions for the account, wherein each closed transaction is an online transaction that was closed after any of the contacts or leads associated with the account had been exposed to any of the internet marketing campaigns;

identifying, with the integrated platform and for each closed transaction:
- a first internet marketing campaign to which any of the contacts or leads associated with the account was exposed,
- a last internet marketing campaign to which any of the contacts or leads associated with the account was exposed, and
- an additional internet marketing campaign to which any of the contacts or leads associated with the account was exposed;

for each of the closed transactions, determining with the integrated platform, respective contributions of the first internet marketing campaign, the last internet marketing campaign, and the additional internet marketing campaign to the closed transaction and;

outputting, from the integrated platform to an output device, a report that is generated based on determining the respective contributions, wherein the report visually represents at least one of:
(i) the closed transactions associated with the first internet marketing campaign, the last internet marketing campaign, and the additional internet marketing campaign, or
(ii) sources of the identified internet marketing campaigns associated with the closed transactions.

2. The method of claim 1, further comprising generating a key performance indicator report, the key performance indicator report graphically and numerically representing for, each source of a respective internet marketing campaigns associated with a respective closed transaction, a cost per opportunity won, a cost per opportunity, and a cost per response.

3. The method of claim 1, further comprising generating a marketing contribution report, the marketing contribution report graphically and numerically representing relative contributions of the sources to the closed transactions as bar graphs and associated numerical information;

wherein the sources comprise various sales divisions;
wherein, and for each of a plurality of sales divisions:
- a relative contribution of the source is represented as a number of closed transactions,
- a contribution of the source to each of a plurality of marketing opportunities is represented as a number of created opportunities,
- a marketing sales source contribution is represented as a marketing sales source contribution currency value,
- a total amount of new sales opportunities created by the source is represented as a new sales opportunities currency value and a new sales opportunities percentage, and
- a total amount of marketing-sourced sales opportunities is represented as a marketing-sourced sales currency value and a marketing-sourced sales percentage.

4. The method of claim 1, further comprising generating a return-on-investment report, the return-on-investment report graphically and numerically representing return on investment for each of the identified internet marketing campaigns.

5. The method of claim 1, further comprising generating a conversion-rate-by-offer report, the conversion-rate-by-offer report graphically and numerically representing a number of impressions, a number of clicks, a click response rate, and a response to opportunity rate.

6. The method of claim 5, further comprising generating a sales cycle length report, the sales cycle length report graphically and numerically representing, for each of a set of tactics, a time-to-won opportunity, a number of impressions, a number of clicks, a click response rate, and a response to opportunity rate.

7. The method of claim 1, further comprising:
generating a closed-loop funnel report, the closed-loop funnel report graphically and numerically representing each of the identified internet marketing campaign exposures and results of each of the identified internet marketing campaign exposures; and
wherein the results of each of the identified internet marketing campaign exposures include conversions.

8. A computer program product for analyzing online exposures to internet marketing campaigns using an online analytics tool integrated with a customer relationship management (CRM) system, the computer program product comprising:
a non-transitory computer-readable storage medium, having stored thereon program code that, when executed by one or more processors of one or more computing devices, cause the one or more computing devices to perform operations comprising:
integrating the online analytics tool and the CRM system into a platform with a common point-of-interface by (i) configuring the online analytics tool to retrieve CRM data from the CRM system and (ii) creating a mapping between the CRM data and website visitation statistics tracked by the online analytics tool, the CRM system comprising a CRM database storing records of contacts and leads associated with an account, the online analytical tool comprising a web analytics database storing the website visitation statistics for the contacts and leads associated with the account, wherein the website visitation statistics are received via cookies set at browsers executed by multiple computing devices associated with the contacts and leads;
identifying, with the integrated platform and from marketing exposure data that uses the mapping between the integrated online analytics tool and the CRM system, exposures of contacts or leads associated with the account to any of a plurality of internet marketing campaigns;

identifying, with the integrated platform from the website visitation statistics, a plurality of closed transactions for the account, wherein each closed transaction is an online transaction that was closed after any of the contacts or leads associated with the account had been exposed to any of the internet marketing campaigns;

identifying, with the integrated platform and for each closed transaction:
  a first internet marketing campaign to which any of the contacts or leads associated with the account was exposed,
  a last internet marketing campaign to which any of the contacts or leads associated with the account was exposed, and
  an additional internet marketing campaign to which any of the contacts or leads associated with the account was exposed;

for each of the closed transactions, determining with the integrated platform, respective contributions of the first internet marketing campaign, the last internet marketing campaign, and the additional internet marketing campaign to the closed transaction; and outputting, from the integrated platform and to an output device, a report that is generated based on determining the respective contributions, wherein the report visually represents at least one of:
  (i) the closed transactions associated with the first internet marketing campaign, the last internet marketing campaign, and the additional internet marketing campaign, or
  (ii) sources of the identified internet marketing campaigns associated with the closed transactions.

9. The computer program product of claim 8, further comprising program code for performing operations comprising:
  forming an account campaign array comprising a chronological representation of the marketing exposure data for any of the contacts and leads associated with the account; and
  identifying, from the account campaign array for each closed transaction, at least two campaign of the first internet marketing campaign, the last internet marketing campaign, and the additional internet marketing campaign.

10. The computer program product of claim 8, wherein the program code for determining respective contributions of the first internet marketing campaign, the last internet marketing campaign, and the additional internet marketing campaign to the closed transaction comprises program code for applying a campaign sequence attribution algorithm to determine the effect of various types of internet marketing campaigns.

11. The computer program product of claim 10, wherein the program code for applying the campaign sequence attribution algorithm comprises program code for tracking a plurality of sequential aspects of an internet marketing campaign.

12. A system for analyzing online exposures to internet marketing campaigns using an online analytics tool integrated with a customer relationship management (CRM) system, the system comprising:

a processor;
a storage device coupled to the processor and storing computer-executable instructions that, when executed by the processor, causes the processor to perform steps comprising:
  integrating the online analytics tool and the CRM system into a platform with a common point-of-interface by (i) configuring the online analytics tool to retrieve CRM data from the CRM system and (ii) creating a mapping between the CRM data and website visitation statistics tracked by the online analytics tool, the CRM system comprising a CRM database storing records of contacts and leads associated with an account, the online analytical tool comprising a web analytics database storing the website visitation statistics for the contacts and leads associated with the account, wherein the website visitation statistics are received via cookies set at browsers executed by multiple computing devices associated with the contacts and leads;
  identifying, with the integrated platform and from marketing exposure data that uses the mapping between the integrated online analytics tool and the CRM system, exposures of contacts or leads associated with the account to any of a plurality of internet marketing campaigns;
  identifying, with the integrated platform and from the website visitation statistics, a plurality of closed transactions for the account, wherein each closed transaction is an online transaction that was closed after any of the contacts or leads associated with the account had been exposed to any of the internet marketing campaigns;
  identifying, with the integrated platform and for each closed transaction:
    a first internet marketing campaign to which any of the contacts or leads associated with the account was exposed,
    a last internet marketing campaign to which any of the contacts or leads associated with the account was exposed, and
    an additional internet marketing campaign to which any of the contacts or leads associated with the account was exposed;
  for each of the closed transactions, determining, with the integrated platform, respective contributions of the first internet marketing campaign, the last internet marketing campaign, and the additional internet marketing campaign to the closed transaction; and
  outputting, from the integrated platform to an output device, a report that is generated based on determining the respective contributions, wherein the report visually represents at least one of:
    (i) the closed transactions associated with the first internet marketing campaign, the last internet marketing campaign, and the additional internet marketing campaign, or
    (ii) sources of the identified internet marketing campaigns associated with the closed transactions.

13. The system of claim 12, wherein the processor is further configured for:
  forming an account campaign array comprising a chronological representation of the marketing exposure data for any of the contacts and leads associated with the account; and
  identifying, from the account campaign array for each closed transaction, at least two campaign of the first internet marketing campaign, the last internet marketing campaign, and the additional internet marketing campaign.

14. The system of claim 12, wherein the processor is configured for determining respective contributions of the first internet marketing campaign, the last internet marketing campaign, and the additional internet marketing campaign to the closed transaction by applying a campaign sequence attribution algorithm to determine the effect of various types of internet marketing campaigns.

15. The system of claim 14, wherein the processor is configured for performing the campaign sequence attribution algorithm by tracking a plurality of sequential aspects of an internet marketing campaign.

16. The system of claim 14, wherein the applying the campaign sequence attribution algorithm further comprises:
using metadata associated with a campaign ID for each of the plurality of internet marketing campaigns and timestamps indicating dates on which any contacts or leads of any of the accounts was exposed thereto, to evaluate an allocation of the various types of the plurality of internet marketing campaigns
wherein the campaign sequence attribution algorithm sorts the plurality of internet marketing campaigns according to said dates, and
wherein the campaign sequence attribution algorithm compares opportunity creation dates to a list of the plurality of internet marketing campaigns and allocates campaign attribution accordingly.

* * * * *